(12) United States Patent
Leynes

(10) Patent No.: US 7,985,117 B2
(45) Date of Patent: Jul. 26, 2011

(54) TOY VEHICLE FOR SUPPORTING A DOLL ON A VEHICLE

(75) Inventor: Gary Leynes, Long Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 12/610,119

(22) Filed: Oct. 30, 2009

(65) Prior Publication Data

US 2010/0109279 A1    May 6, 2010

Related U.S. Application Data

(63) Continuation-in-part of application No. 12/287,033, filed on Oct. 3, 2008.

(60) Provisional application No. 60/997,395, filed on Oct. 3, 2007.

(51) Int. Cl.
*A63H 3/00* (2006.01)

(52) U.S. Cl. ........ 446/268; 446/269; 446/275; 446/279; D12/114; D12/115; D21/658; 224/420

(58) Field of Classification Search .................. 446/275, 446/279, 268; D21/538, 658; D12/114.115; D12/108; 248/188.8; 74/551.8; 224/420
See application file for complete search history.

(56) References Cited

U.S. PATENT DOCUMENTS

| | | | |
|---|---|---|---|
| 0,846,695 A | 3/1907 | Reed | |
| 1,069,160 A * | 8/1913 | Meltz | 248/230.5 |
| 2,159,974 A | 5/1939 | Lohr | |
| 2,492,595 A | 12/1949 | Rhoer | |
| 2,511,169 A * | 6/1950 | McAvoy | 446/274 |
| 3,318,615 A | 5/1967 | Chreist, Jr. | |
| 3,516,632 A * | 6/1970 | Hall | 248/176.1 |
| 3,574,969 A | 4/1971 | Cleveland et al. | |
| D237,641 S * | 11/1975 | Kato | D21/538 |
| 4,108,535 A | 8/1978 | Slaughter | |
| 4,120,561 A | 10/1978 | Burkholder | |
| 4,282,993 A | 8/1981 | Humlong | |
| 4,390,927 A | 6/1983 | Von Feldt | |
| 4,500,104 A | 2/1985 | Rudell et al. | |
| D281,964 S | 12/1985 | Rudell et al. | |
| D281,965 S | 12/1985 | Rudell et al. | |
| 4,571,207 A | 2/1986 | Henderson et al. | |
| D291,291 S | 8/1987 | Voytko et al. | |
| 4,845,830 A | 7/1989 | Nolte et al. | |

(Continued)

FOREIGN PATENT DOCUMENTS

GB    2126489    3/1984

(Continued)

OTHER PUBLICATIONS

International Search Report for PCT/US2008/011436, dated Dec. 8, 2008, 3 pages.

*Primary Examiner* — Gene Kim
*Assistant Examiner* — Matthew B Stanczak
(74) *Attorney, Agent, or Firm* — Edell, Shapiro & Finnan, LLC

(57) ABSTRACT

A toy vehicle for a doll that can be coupled to a child's vehicle is disclosed. In one implementation, the toy vehicle is a toy scooter that is configured to support a doll in a standing configuration.

26 Claims, 22 Drawing Sheets

U.S. PATENT DOCUMENTS

| | | | |
|---|---|---|---|
| 5,211,075 A | 5/1993 | Martin-Rossman | |
| 5,332,183 A | 7/1994 | Kagayama | |
| 5,355,746 A * | 10/1994 | Lin | 224/420 |
| 5,735,441 A | 4/1998 | Fujimoto | |
| 5,845,830 A | 12/1998 | Dreiling | |
| 6,062,053 A | 5/2000 | Ho | |
| 6,176,759 B1 | 1/2001 | Trageser | |
| D445,145 S * | 7/2001 | Yang | D21/423 |
| 6,264,223 B1 | 7/2001 | Loewke et al. | |
| D449,860 S * | 10/2001 | Lin | D21/423 |
| 6,431,940 B1 * | 8/2002 | Buford et al. | 446/277 |
| 6,616,501 B2 | 9/2003 | Spalinski | |
| 6,729,933 B2 | 5/2004 | Hoeting et al. | |
| 6,872,117 B1 | 3/2005 | Chen | |
| 6,942,131 B2 | 9/2005 | Trautman et al. | |
| 7,077,302 B2 | 7/2006 | Chuang | |
| D530,381 S | 10/2006 | Saruhashi | |
| 7,144,024 B2 | 12/2006 | Falkner et al. | |
| 7,191,924 B2 | 3/2007 | Kilmer | |
| 2002/0086609 A1 | 7/2002 | Donohoe | |
| 2003/0106919 A1 | 6/2003 | Chuang | |
| 2003/0148704 A1 | 8/2003 | Hollick | |
| 2004/0087244 A1 | 5/2004 | Tilbor et al. | |
| 2004/0094590 A1 | 5/2004 | Hollick | |
| 2004/0248499 A1 | 12/2004 | Costa | |
| 2005/0109808 A1 | 5/2005 | Ueda | |
| 2005/0164600 A1 | 7/2005 | Sakai | |
| 2007/0108244 A1 | 5/2007 | Chuang | |
| 2007/0205242 A1 | 9/2007 | Finlaw et al. | |
| 2010/0127030 A1 * | 5/2010 | Muhlberger | 224/420 |

FOREIGN PATENT DOCUMENTS

| | | |
|---|---|---|
| JP | 9-109961 | 4/1997 |
| JP | 2004-90742 | 3/2004 |

* cited by examiner

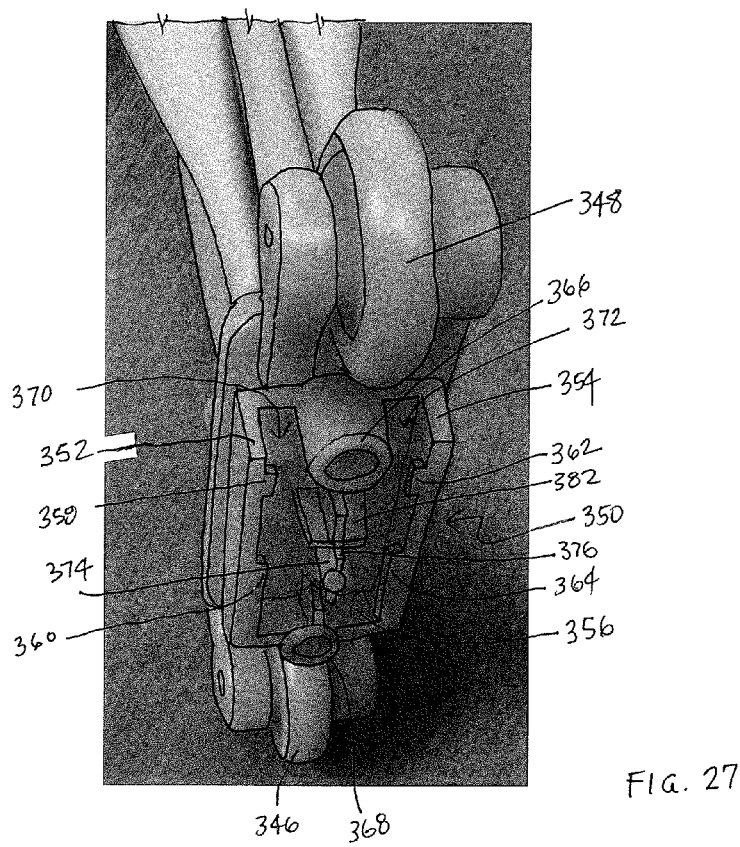

TOY VEHICLE FOR SUPPORTING A DOLL ON A VEHICLE

CROSS-REFERENCE TO RELATED APPLICATIONS

This application is a continuation-in-part application of U.S. Non-Provisional patent application Ser. No. 12/287,033, filed Oct. 3, 2008, entitled "Miniature Toy for Supporting a Doll on a Bicycle," which claims the benefit of and priority under 35 USC 119(e) of U.S. Provisional Patent Application No. 60/997,395 entitled MINIATURE TOY FOR SUPPORTING A DOLL ON A BICYCLE filed Oct. 3, 2007 in the name of Gary Leynes, the disclosure of both of which is incorporated herein by reference.

FIELD OF THE INVENTION

This invention relates generally to vehicles, such as bicycles and scooters, and particularly to accessory toys used in combination therewith.

BACKGROUND OF THE INVENTION

While the basic bicycle has been manufactured and sold for many years and has enjoyed popularity, practitioners in the art have sought to provide additional accessories for the basic bicycle. In attempting to provide such accessories, practitioners in the art endeavor to improve the appeal and play value of the bicycle. One family of bicycle accessories which has proven to be very popular through the years may be generally described as handle bar attachment accessories. Such accessories have included functional items such as battery-powered lights, mirrors or bells and horns. Additionally, items have been provided which are substantially nonfunctional but intended to provide aesthetic appointments for the bicycle.

For example, U.S. Pat. No. 4,108,535 issued to Slaughter sets forth a SAFETY DEVICE FOR BICYCLE suitable for mounting on bicycles which includes a pin wheel rotatable in response to air flow relative to the bicycle. The pin wheel carries a pattern of material visually perceptible from a distance which changes in appearance upon rotation of the pin wheel. A shroud surrounds the pin wheel to prevent accidental contact with the rotating pin wheel and to direct air flow against the pin wheel to enhance rotation.

U.S. Pat. No. 4,120,561 issued to Burkholder sets forth a LIGHT REFLECTIVE SIGNALING AND WARNING DEVICE which is attachable to an otherwise conventional bicycle or the like. The pin wheel-like device is positioned in the air flow passing over the moving bicycle. Air flow rotates the highly visible light reflective pin wheel device to provide visual alert to persons proximate to the moving bicycle.

Japanese patent 2004-90742 provides a spherical aesthetic and utility device configured to be attachable to the cross bar of a bicycle. The device may be styled in various appearances such as a soccer ball and the like. An internal compartment within the spherical device provides storage of articles In addition to apparatus which provides for attachment of safety or aesthetic devices on a bicycle, a similar family of devices has been provided which may be generally described as doll or passenger carrying seats or attachments. For example, U.S. Pat. No. 5,211,075 issued to Martin-Rossman sets forth a HANDLEBAR MOUNTED BIKE ACCESSORY which includes a spring mounted figurine having its torso and arms releasably engaged with a bicycle handlebar. The figurine member may be removed from the handlebar and utilized in conventional doll play.

U.S. Pat. No. 4,500,104 and Des. 281,964, both issued to Rudell et al., set forth apparatus for securing a doll receiving seat upon the handlebars of a bicycle. The seat is secured to the handlebars cross portion and the bicycle fork member and facilitates the attachment of a doll figure thereon. In addition, the lower portion the seat is in contact with the front wheel of the bicycle to provide rotational power for moving the dolls legs as the bicycle moves.

Published patent application US 2004/0094590 filed by Hollic sets forth a CHILD'S TOY CADDY for use with a conveyance such as a bicycle, tricycle or scooter. A miniature seat is configured to receive and captivate a doll and is further attachable to the handlebars of the vehicle.

U.S. Pat. No. 7,144,024 issued to Falkner et al. sets forth a RIDE-ALONG QUICK RELEASE DOLL CARRIER AND DOLL HELMET having a doll receiving seat supported over the rear wheel of a child's bicycle. The doll is received in a forward facing position and is secured by conventional harness apparatus. The seat cooperates with a head protecting helmet for the doll.

U.S. Pat. No. 6,264,223 issued to Loewke et al. sets forth a PASSENGER CARRIER FOR BICYCLE which is receivable upon the bicycle in a manner spanning forwardly from the seat post to the front fork attachment. The seat includes a sitting portion together with a front riser and a seat back. An appropriate cushioning material is provided for the seat.

U.S. Pat. No. 5,845,830 issued to Dreiling sets forth a BICYCLE ATTACHABLE SEAT ASSEMBLY FOR CARRYING OBJECTS having a seat portion secured to a forwardly extending support member. The forwardly extending support member terminates in an attachment clamp suitable for securing the seat to a portion of a host vehicle such as a bicycle. The clamp optimally engages the seat post of the host bicycle such that the seat is positioned above the rear wheel of the bicycle.

U.S. Pat. No. 3,318,615 issued to Chreist, Jr. and Japanese patent 9-109961 both set forth early examples of toy doll carriers for use with bicycles or the like.

In a related art, a number of patents show apparatus which provide for attachment and carrying of utility articles. Thus, U.S. Pat. No. 7,191,924 issued to Kilmer sets forth a BICYCLE CELL PHONE HOLDER while published US Patent application 2003/0106919 filed by Chuang sets forth a general purpose attachment clamp for a bicycle. Similarly, Published US Patent application US 2007/0205242 filed by Finlaw et al. sets forth a SKATEBOARD CARRIER FOR BICYCLE and published US Patent application US 2007/0108244 also filed by Chuang sets forth MOUNT FOR INSTALLING ACCESSORIES ON A BICYCLE. U.S. Pat. No. 5,332,183 issued to Kagayama sets forth an ATTACHMENT APPARATUS FOR TWO-WHEELED VEHICLE PARTS FOR ENABLING HIGHLY RELIABLE ATTACHMENT suitable for general purpose use.

In a further related art, practitioners have provided a number of apparatus suitable for securing a general carryall basket to a bicycle or the like. Such devices are similar in construction and general to their relation to the present invention and include U.S. Pat. Des. 291,291 issued to Voytko et al.; U.S. Pat. No. 6,062,053 issued to Ho; U.S. Pat. No. 2,492,595 issued to Rhoer and U.S. Pat. No. 846,695 issued to Reed.

Further apparatus which relates generally as background material with respect to the present invention is set forth in U.S. Pat. No. 6,431,940 issued to Buford et al.; U.S. Pat. D530,381 issued to Saruhashi; U.S. Pat. No. 3,574,969 issued to Cleveland; U.S. Pat. No. 6,729,933 issued to Hoeting et al.; and U.S. Pat. No. 4,571,207 issued to Henderson et al While the foregoing prior art devices have to some extend improved the art and in some instances enjoyed commercial success, there remains nonetheless a continuing need in the art for ever more improved, interesting and play value enhancing apparatus for use with bicycles, tricycles, scooters, and the like.

SUMMARY OF THE INVENTION

Accordingly, it is a general object of the present invention to provide an apparatus for improving the play value of a vehicle, such as a bicycle or a scooter. It is a more particular object to improve the aesthetics thereof.

In accordance with one embodiment of the present invention, a miniature toy for supporting a doll on a bicycle provides a doll-sized miniature bicycle which is fully functional in that it receives and supports a correspondingly sized doll in the posture of a rider is supported upon a bicycle. The miniature bicycle further includes apparatus for securing the doll upon the bicycle seat and securing the dolls legs and arms in a posture generally replicating a riding posture. Additionally, the miniature toy bicycle further includes a releasable clamp attachment which secures the miniature bicycle and doll supported thereon to the handle bar or neck of the bicycle. The clamp is releasable and facilitates removing the miniature toy bicycle and its doll from the bicycle handle bars or supporting neck for use in a conventional play pattern.

In another embodiment of the invention, a miniature toy for supporting a doll on a vehicle includes a toy scooter to which a doll can be coupled. The toy scooter can be coupled to a child's scooter. When the toy scooter is coupled, the toy scooter and the doll are positioned in the same orientation as a child riding on the child's scooter.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 24 illustrates a side view of the mounting component of the coupling mechanism of FIG. 22;

FIG. 25 illustrates a cross-sectional side view of the mounting component of FIG. 24;

FIG. 26 illustrates an end view of the mounting component of FIG. 24;

FIG. 27 illustrates a bottom perspective view of the coupler of the toy of FIG. 10;

FIG. 28 illustrates a side view of a component of the coupler of FIG. 27;

Like reference numerals have been used to identify like elements throughout this disclosure.

DETAILED DESCRIPTION OF THE INVENTION

By way of overview, the present invention miniature toy for supporting doll on a bicycle provides a doll-sized miniature bicycle which is fully functional in that it receives and supports a correspondingly sized doll in the posture of a rider. The miniature bike further includes apparatus for securing the doll upon the bicycle seat and securing the dolls legs and arms in a posture generally replicating a riding posture. Additionally, the miniature toy bicycle further includes a releasable clamp attachment which secures the miniature bicycle and doll supported thereon to the handle bar or neck of the bicycle. The clamp is releasable and facilitates removing the miniature toy bicycle and its doll from the bicycle handle bars or supporting neck for use in a conventional play pattern.

Figure 1:
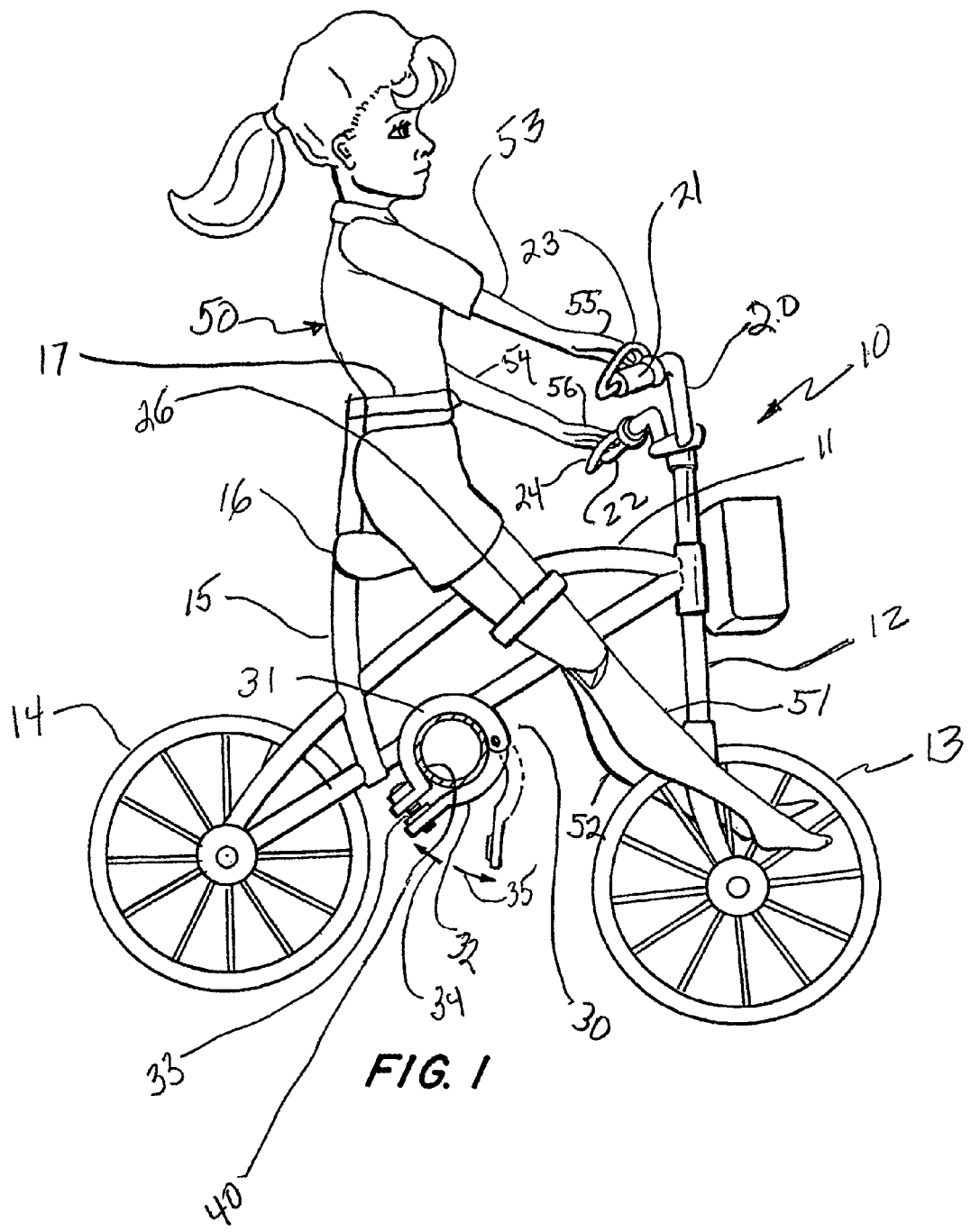
FIG. 1 sets forth a side elevation view of a miniature toy supported upon a bicycle handle and having a doll supported thereon.

FIG. 1 sets forth a side view of a miniature toy bicycle generally referenced by numeral 10 supported upon a conventional bicycle handle bar 40 by a clamp 30. As is also seen in FIG. 1, miniature toy bicycle 10 further supports a doll 50 simulating a bicycle rider.

More specifically, miniature bicycle 10 includes a frame 11 having a front fork 12 supporting a front wheel 13. Frame 11 further supports a rear wheel 14 and a portion of a clamp 30. Front fork 12 further supports a handle bar 20 having hand grips 21 and 22 together with hand loops 23 and 24. Frame 11 further supports a vertically extending seat frame 15 which supports a doll seat 16 and extends upwardly to support a waist clip 17. Frame 11 further supports a pair of leg clips such as leg clip 26.

In addition, miniature toy bicycle 10 further supports a doll 50 which is fabricated substantially in accordance with conventional fabrication techniques and which enjoys the type of articulation normally found in so-called "fashion dolls". Doll 50 is fabricated to include a pair of legs 51 and 52 as well as arms 53 and 54. Arm 53 supports a hand 55 receives within hand loop 23 while arm 54 supports a hand 56 received within hand loop 24. Waist clip 17 secures the torso portion of doll 50 upon seat 16 while a pair of leg clips such as leg clip 26 secures legs 51 and 52 to frame 11.

In the manner shown, miniature toy bicycle 10 supports doll 50 in a removable attachment whereby doll 50 may be separated from waist clip 17 and leg clips 26 to allow conventional play with doll 50.

As set forth below in greater detail, miniature toy bicycle 10 further includes a handle bar clamp 30 and an upper jaw 31 and a hingedly coupled lower jaw 32. Jaws 31 and 32 are shown grasping the upper and lower portions of a conventional bicycle handle bar 40. A fastener 33 joins the outer portions of upper jaw 31 and lower jaw 32 to press lower jaw 32 against upper jaw 31 in the direction indicated by arrow 34. In the event the user wishes to remove clamp 30 from the host bicycle handle bar, the user simply removes fastener 33 freeing lower jaw 32 and thereafter pivoting lower jaw 32 outwardly in the direction indicated by arrow 35 to the position shown in phantom line depiction. In this manner, the entirety of miniature toy bicycle 10 and doll 50 as well as clamp 30 are removed from the host bicycle handle bar 40. It will be apparent to those skilled in the art that clamp 30 is secured to handle bar 40 by the reverse process in which clamp 30 is positioned with upper jaw 31 as shown and in which lower jaw 32 is pivoted beneath handle bar 40 in the direction indicated by arrow 34. Thereafter, fastener 33 is secured between upper jaw 31 and lower jaw 32 and tightened to a sufficient griping force. As is set forth below in FIG. 2 in greater detail, the combination of miniature toy bicycle 10 and doll 50 may be easily removed from the remainder of clamp 30 by simply pulling miniature bicycle 10 upwardly to release the snap-fit clamp securing miniature bicycle 10 to clamp 30 and thereby handle bar 40.

Figure 2:
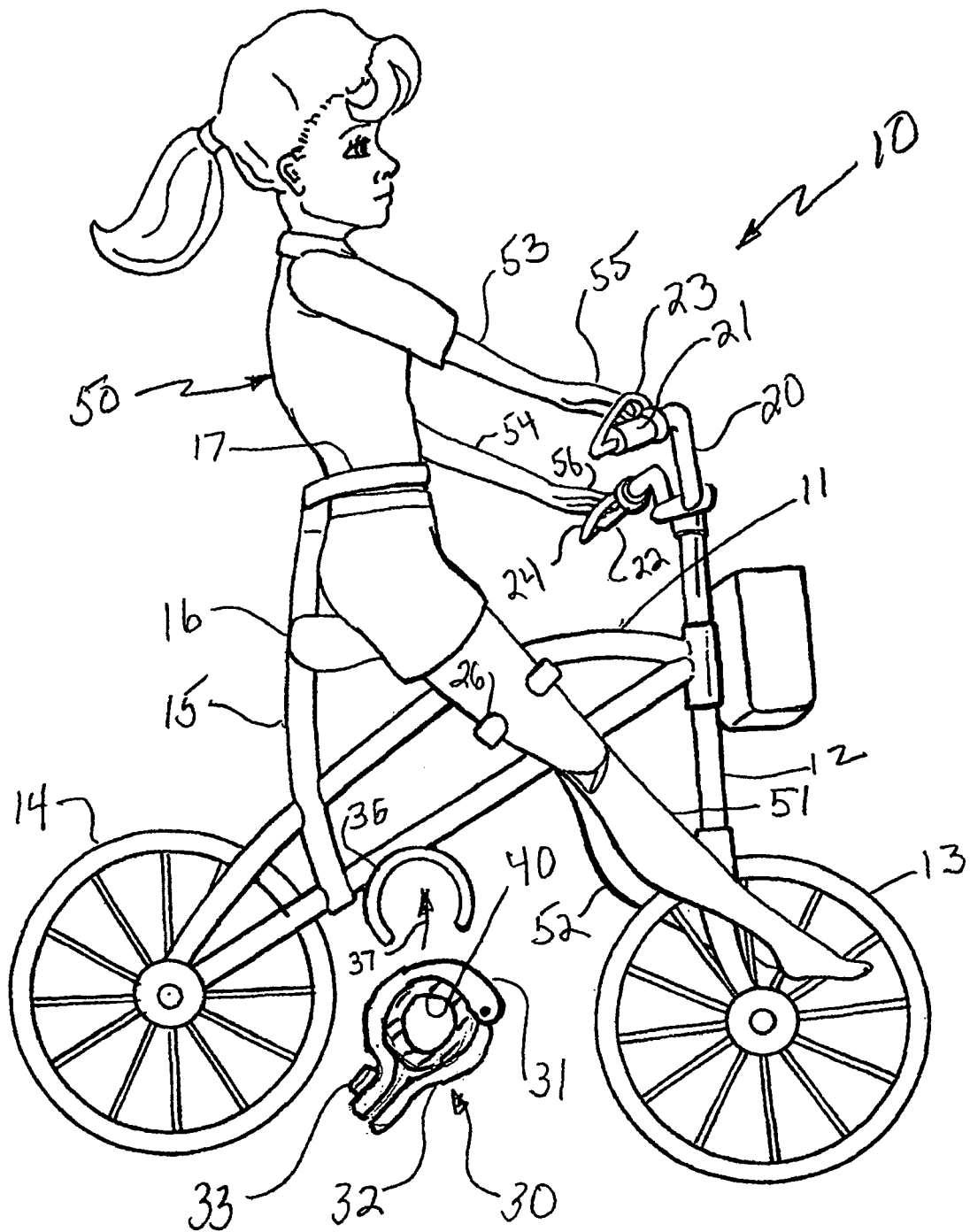
FIG. 2 sets forth a side elevation view of the miniature toy bicycle and supported doll released from the bicycle handle bars for conventional play.

FIG. 2 sets forth a side view of miniature toy bicycle 10 together with doll 50 having the combination thereof removed from clamp 30. In the figure shown in FIG. 2, the remainder of clamp 30 is secured to handle bar 40 in the manner described above. Thus, in essence, the snap-fit attachment which secures miniature toy bicycle 10 to the remainder of clamp 30 facilitates a simple removal by lifting miniature toy bicycle 10 upwardly in the direction indicated by arrow 37.

As mentioned above, FIG. 2 shows miniature toy bicycle 10 and doll 50 removed from the remainder of clamp 30. Frame 11 includes a resilient snap clasp 36 which is snap-fit attachable to the remainder of clamp 30 in the manner set forth below in FIGS. 4 and 5. Suffice it to note here, that clasp 36 is sufficient resilient being formed of substantially the same plastic material from which the remainder of frame 11 is formed such that the open ends of clasp 36 may be forced apart as clasp 36 is forced downwardly upon upper jaw 31 of clamp 30. The resilience of clasp 36 facilitates the spreading of the clasp to allow a snap-fit engagement to clamp 30. Thus, attachment of miniature bicycle 10 and doll 50 to handle bar 40 once clamp 30 is installed is facilitated by simply positioning snap clasp 36 upon the upper portion of clamp 30 and forcing it downwardly for snap-fit attachment. Conversely, miniature toy bicycle 10 and doll 50 are removed for conventional play by drawing upwardly in the direction indicated by arrow 37 again forcing the lower ends of clasp 36 to spread outwardly and releasing miniature toy bicycle 10 from clamp 30.

Figure 3:
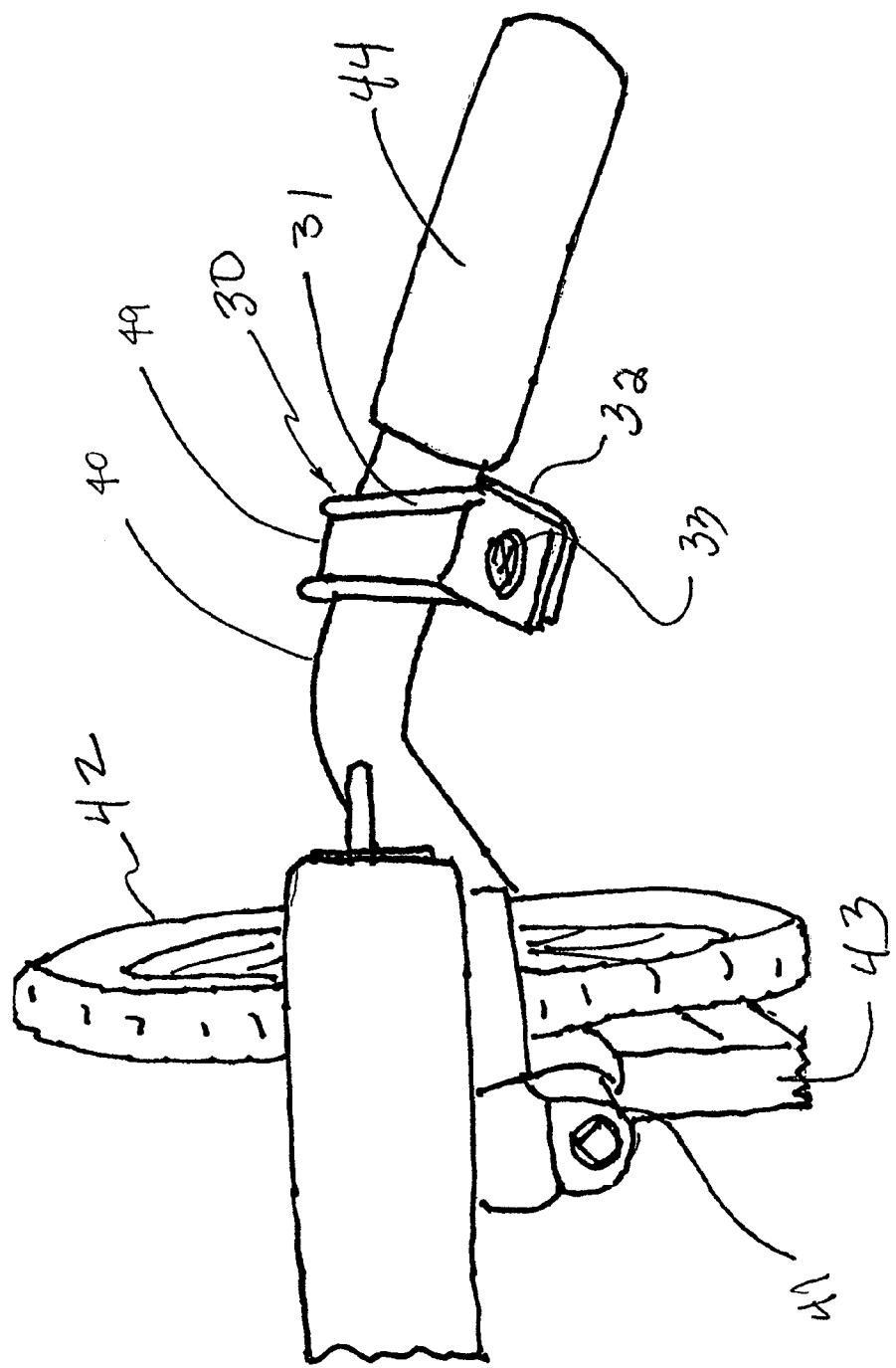
FIG. 3 sets forth a partial top perspective view of a bicycle handle bar supporting the clamp portion of the present invention toy.

FIG. 3 sets forth a partial top perspective view of a conventional bicycle having a handle bar 40 fabricated of a tubular metal material supported by a handle bar neck 41 upon a bicycle frame 43. Bicycle frame 43 supports additional conventional apparatus such as a front wheel 42. Correspondingly, handle bar 40 supports a hand grip 44. The remainder of the conventional bicycle upon which handle bar 40 is supported should be understood to be entirely conventional in fabrication.

In accordance with an important aspect of the present invention, handle bar clamp 30 described below includes an upper jaw 31 and a lower jaw 32 received upon and captivating handle bar 40. As is also described below, a fastener 33 is secured between upper jaw 31 and lower jaw 32 to provide a clamping force which secures clamp 30 upon handle bar 40. Additionally, clamp 30 defines a clasp channel 49 which receives clasp 36 (seen in FIG. 2) to provide the snap-fit attachment described above. Of importance with respect to the present invention, is the angular disposition of clamp 30 upon handle bar 40. This angled disposition facilitates a straight line attachment of upper jaw 31 and lower jaw 32 upon handle bar 40 by fastener 33 while maintaining the forward inline orientation of clasp channel 49. Correspondingly, when miniature toy bicycle 10 (seen in FIG. 1) is snap-fitted within clasp channel 49 of clamp 30, the alignment of clamp 30 correspondingly aligns miniature toy bicycle 10 in a straight line front to back orientation despite the rearward angle of handle bar 40. This maintains a realistic front to back alignment in parallel with the travel path the host bicycle enhancing the play appeal.

Figure 4:
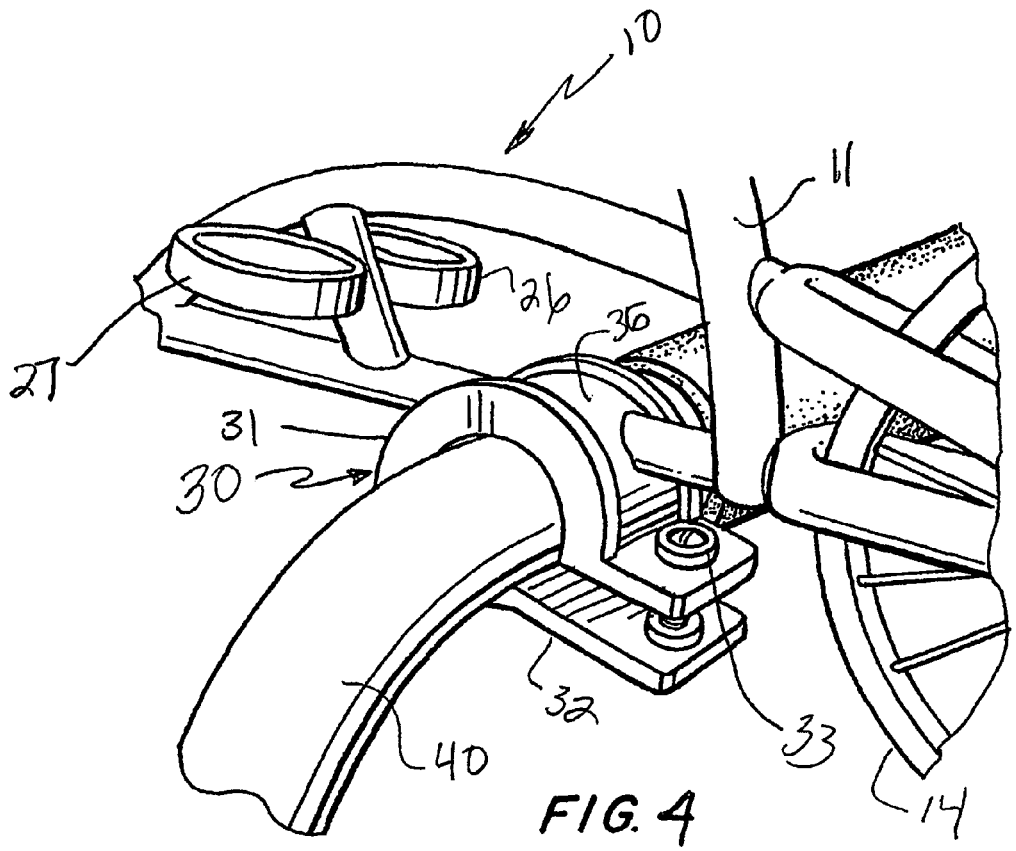
FIG. 4 sets forth a partial perspective view of the present invention miniature toy bicycle secured to its support clamp upon a bicycle handle bar.

FIG. 4 sets forth a partial perspective view of the attachment of miniature toy bicycle 10 to handle bar 40 using clamp 30. As described above, bicycle 10 includes a frame 11 supporting for example a rear wheel 14 together with a pair of leg clips 26 and 27. Additionally, and as is also described above, frame 11 further supports a downwardly open snap clasp 36 which is received upon clamp 30. Clamp 30 includes an upper jaw 31 which as is shown in FIG. 3, defines a clasp channel 49 within which snap clasp 36 is received. Clamp 30 further includes a lower jaw 32. A fastener 33 secures upper jaw 31 to lower jaw 32 to secure clamp 30 upon handle bar 40.

Figure 5:
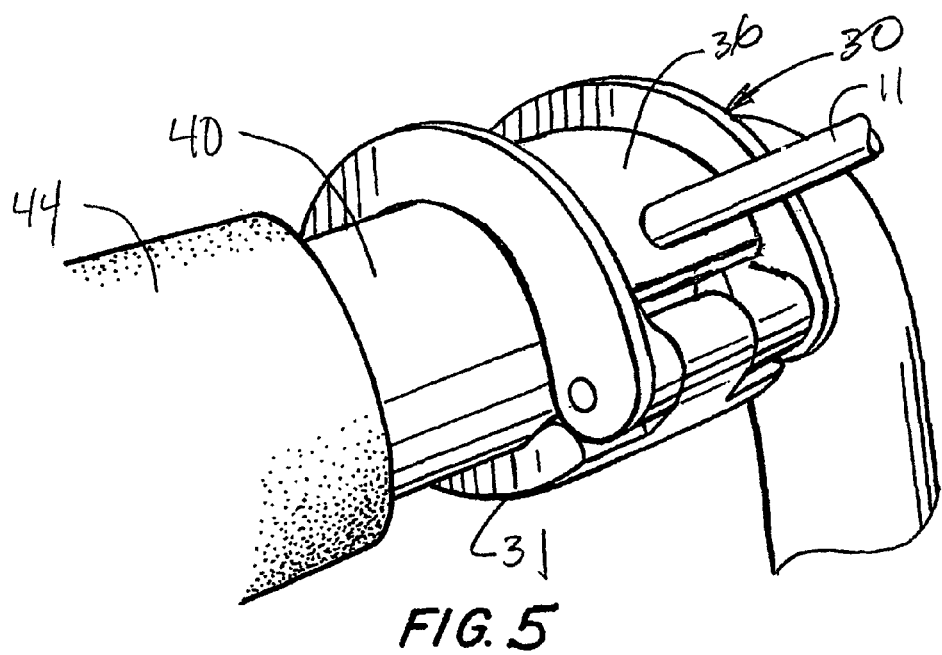
FIG. 5 sets forth a further partial perspective view of the clamp attachment of the present invention toy miniature bicycle.

FIG. 5 sets forth a partial perspective view of clamp 30 secured to handle bar 40 of a host bicycle. It will be noted that FIG. 5 is a partial perspective view from the front portion of handle bar 40. As mentioned above, handle bar 40 supports a hand grip 44 and receives clamp 30 in a secure attachment. As is also mentioned above, miniature toy bicycle 10 is secured upon handle bar 40 by the snap-fit attachment of snap clasp 36 within channel 49 (seen in FIG. 3) of clamp 30.

Figure 6:
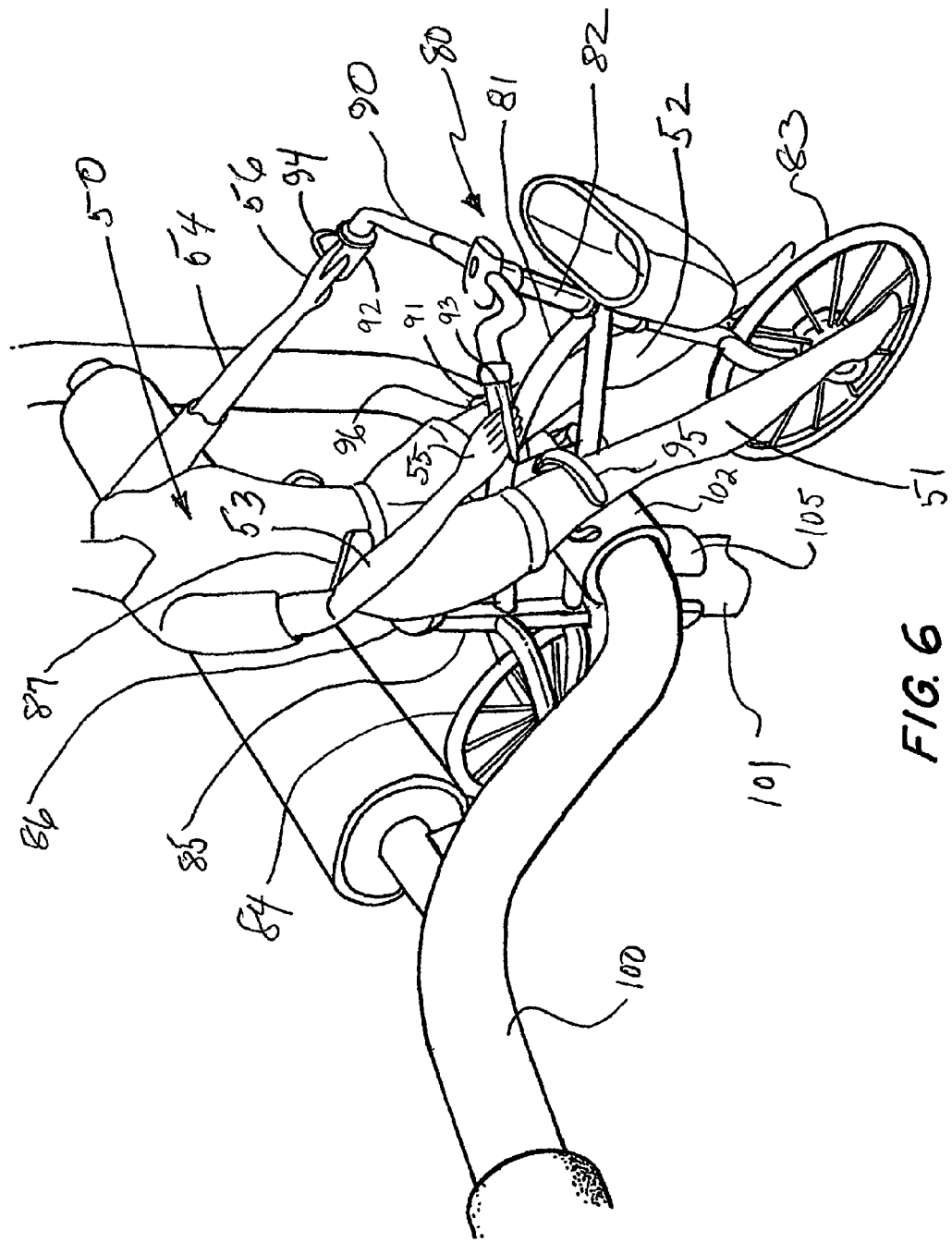
FIG. 6 sets forth a perspective view of an alternate embodiment of the present invention miniature toy for supporting doll on a bicycle having an alternative clamp arrangement secured to the neck portion of a conventional bicycle.

FIG. 6 sets forth a top perspective view of an alternate embodiment of the present invention miniature toy for supporting doll on a bicycle. It will be recognized that a substantial proportion of the miniature toy bicycle in the alternate embodiment of FIG. 6 is substantially identical to toy bicycle 10 described above. By way of overview, the primary difference between miniature toy bicycle 10 and the alternate embodiment of FIG. 6 is found in the manner by which the miniature toy bicycle is secured to the handle bars of a conventional bicycle.

More specifically, a miniature toy bicycle 80 includes a frame 81 supporting a front fork 82 which in turn supports a front wheel 83. Frame 81 further supports a rear wheel 84 and an upwardly extending seat support 85. Seat support 85 further supports a seat 86 together with a waist clip 87. Frame 81 further supports a pair of leg clips 95 and 96. Miniature toy bicycle 80 further includes a handle bar 90 having hand grips 91 and 92 on the outer ends thereof. Handle grips 91 and 92 further include hand loops 93 and 94 respectively.

A conventional doll 50 described above is supported upon seat 86 and includes a pair of legs 51 and 52 received within leg clips 95 and 96 respectively. In addition, waist clip 87 is snap fitted to the torso of doll 50. Doll 50 further includes forwardly extending arms 53 and 54 having hands 55 and 56 received within loops 93 and 94 of grips 91 and 92 respectively. Frame 81 further supports a downwardly open clasp 102 which is secured to a neck clasp 105. Neck clasp 105 and clasp 102 cooperate to secure miniature toy bicycle 80 to the handle bar neck of a conventional bicycle.

A handle bar 100 and neck 101 of a conventional bicycle receive clasp 102 and neck clasp 105 respectively in the manner described below to secure miniature toy bicycle 80 thereto. Suffice it to note here that in accordance with the play pattern set forth above in FIGS. 1 through 5, miniature toy bicycle 80 and doll 50 are snap-fit removable in the manner described below to provide separate play in a conventional play pattern apart from the host bicycle.

Figure 7:
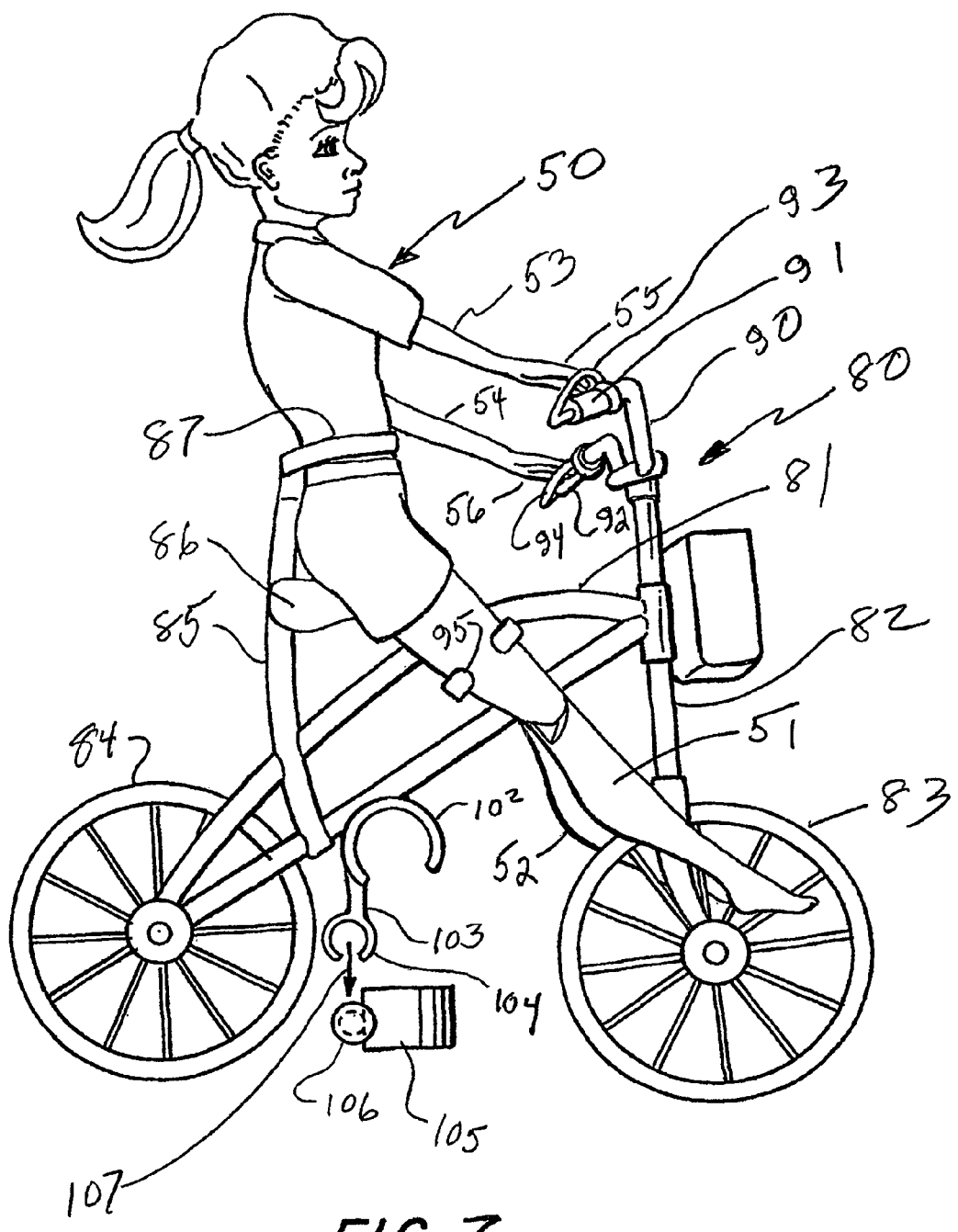
FIG. 7 sets forth a side elevation view of the embodiment of FIG. 6 showing the neck attachment clamp mechanism in assembly view.

FIG. 7 sets forth a side elevation view of the miniature toy bicycle of FIG. 6 apart from the host bicycle. FIG. 7 also shows the neck attachment apparatus of miniature toy bicycle 80 in an assembly view.

Figure 8:
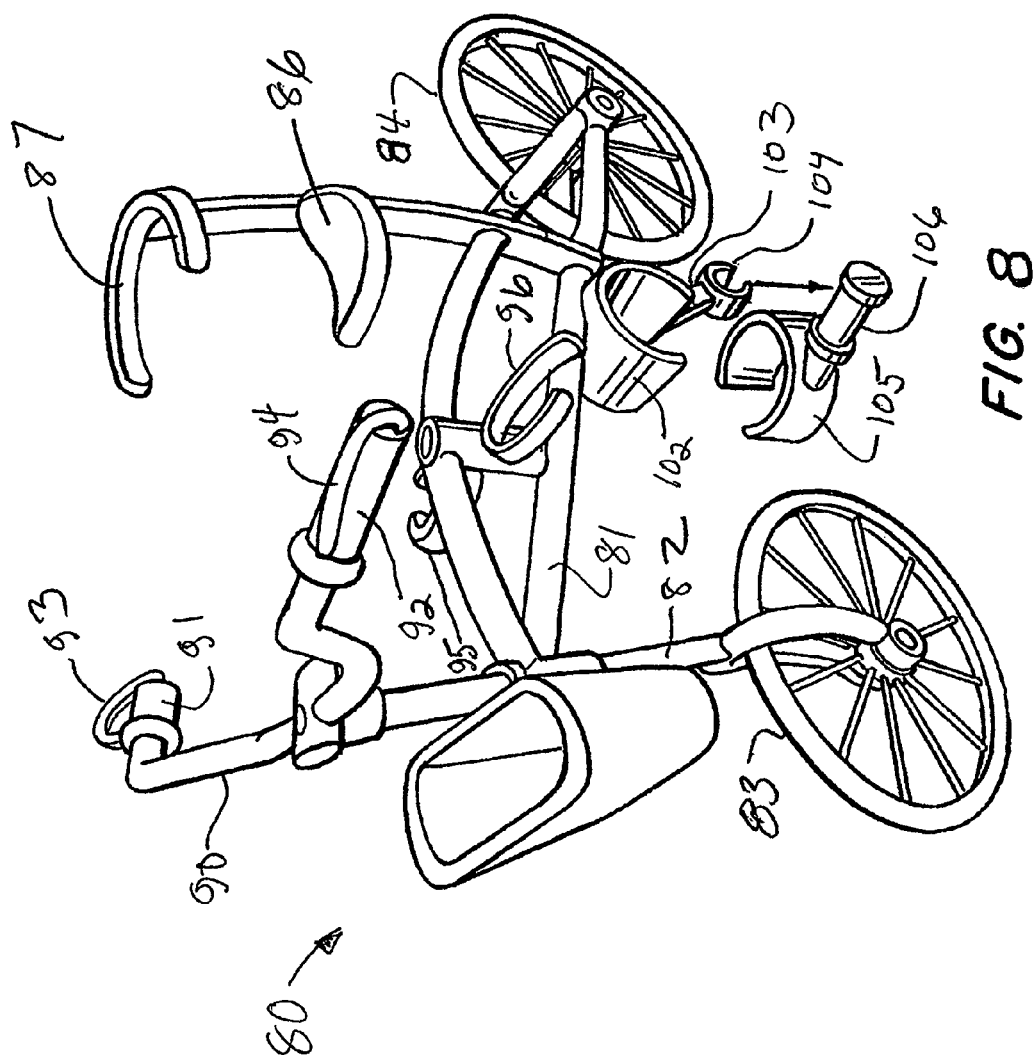
FIG. 8 sets forth a perspective view of the miniature toy of FIG. 7 showing the neck attachment in perspective view.

Clasp 102 is downwardly open and is substantially identical to clasp 36 of miniature toy bicycle 10 set forth in FIGS. 1 through 5. Thus, clasp 102 will be understood to be fabricated of a resilient plastic material and thus be snap-fit attachable to handle bar 100 (seen in FIG. 6) by a forced snap attachment. Clasp 102 differs from clasp 36 described above in that clasp 102 is intended to snap-fit upon handle bar 100 (seen in FIG. 6) directly rather that snap-fitting attachment to an intervening clamp such as clamp 30 shown in FIG. 2. By way of further variation, clasp 102 further includes a downwardly extending arm 103 which in turn supports a resilient clasp 104. A neck clasp 105 which, as is better seen in FIG. 8 is open on one side to snap-fit attach to neck 101 (seen in FIG. 6) includes a post 106. Post 106 receives clasp 104 in a snap-fit attachment as clasp 104 is forced downwardly upon post 106 in the direction indicated by arrow 107. Thus, in the assembly of miniature toy bicycle 80 to handle bar 100 (seen in FIG. 6) clasp 102 is initially forced upon handle bar 100 after which neck clasp 105 is forced upon neck 101 (also seen in FIG. 6). Thereafter, with clasp 102 and neck clasp 105 in place, clasp 104 is secured to post 106 to complete the snap-fit attachment shown in FIG. 9 in greater detail.

FIG. 8 sets forth a further perspective view of bicycle 80 having doll 50 removed therefrom. FIG. 8 also shows the handle bar and neck attachment apparatus provided by clasps 102 and 105 in an assembly view perspective.

Of importance to note in FIG. 8 is the clear illustration of the manner in which clasp 104 is received upon post 106 of neck clasp 105. As mentioned, clasp 104 is preferably formed of a resilient material such as plastic allowing it to be force fitted upon post 106 in a removable snap-fit attachment.

Figure 9:
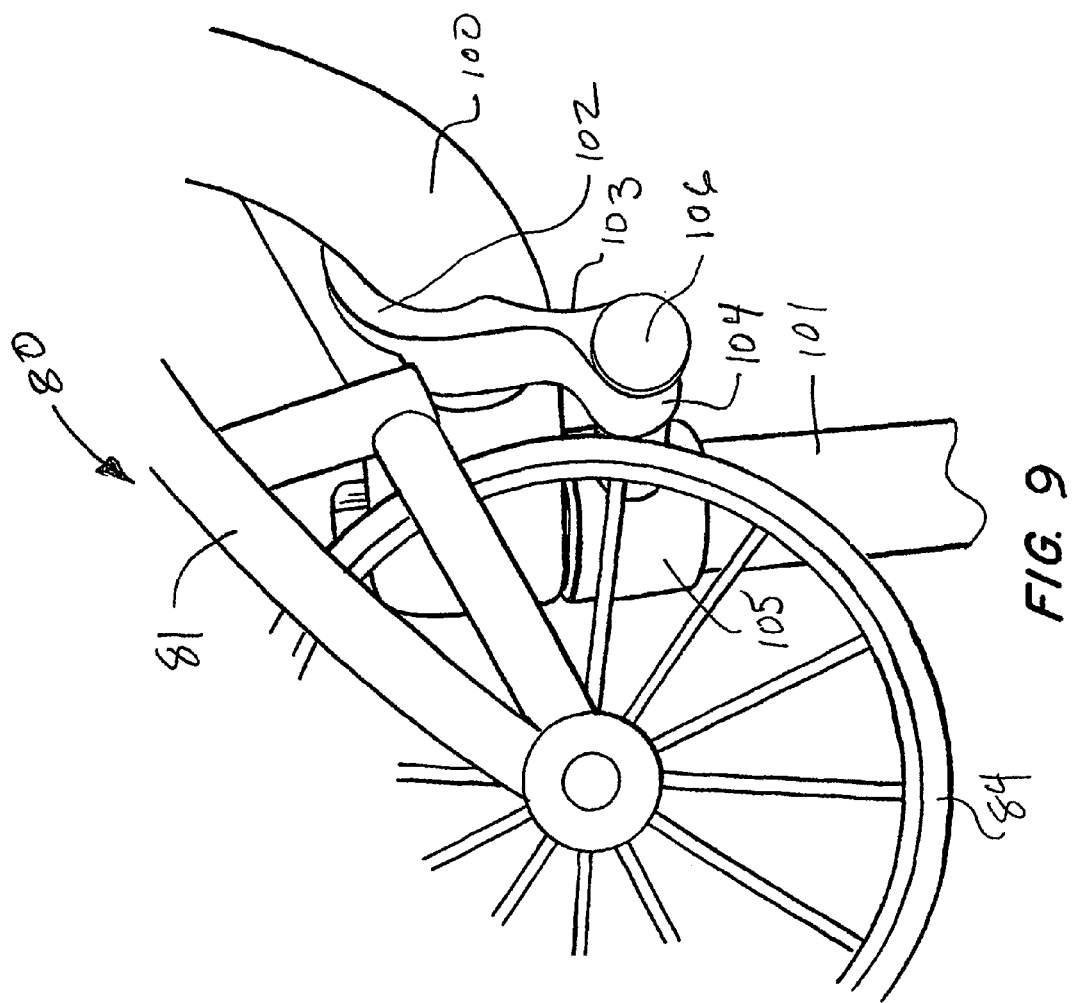
FIG. 9 sets forth a partial side perspective view of the neck attachment apparatus of the present invention miniature toy for supporting doll on a bicycle using a neck attachment.

FIG. 9 sets forth a partial perspective view showing miniature toy bicycle 80 secured to handle bar 100 and handle bar neck 101 utilizing clasps 102 and 105 in the manner described above. Thus, as mentioned above, miniature toy bicycle 80 includes a frame 81 supporting a rear wheel 84. As is also described above, frame 81 supports a clasp 102 having an extension arm 103 which in turn supports a clasp 104. A neck clasp 105 includes a post 106. The attachment of bicycle 80 to neck 101 and handle bar 100 is accomplished by snap-fitting clasp 105 upon neck 101. Thereafter, bicycle 80 is positioned as shown to align clasp 102 with handle bar 100 and align clasp 104 with post 106. Thereafter, the combination of clasp 102 and clasp 104 is forced downwardly while clasp 105 and post 106 are held by the user. The resilient structures of clasps 102 and 104 allow snap-fit attachment thereof to handle bar 100 and post 106 respectively. At this point, miniature toy bicycle 80 is secured to handle bar 100 and neck 101. Removal of miniature toy bicycle 80 from handle bar 100 and neck 101 is accomplished by a reverse procedure in which frame 81 is drawn upwardly overcoming the retaining force of clasp 102 upon handle bar 100 and clasp 106 upon post 104. Thus, miniature toy bicycle 80 may be completely removed from the host bicycle and utilized in a conventional play pattern.

What has been shown is a novel miniature toy for supporting a doll upon a bicycle. In the example shown, the miniature toy comprises a miniature toy bicycle which supports a doll in a conventional riding posture. It will be apparent to those skilled in the art that the security of attachment provided between the miniature toy bicycle and the handle bars and handle bar necks of the host bicycle may be varied by adjusting the resilience of the cooperating clasps which secure the miniature toy bicycle to the host bicycle. In the preferred fabrication of the present invention, this attachment is selected to be very slight to facilitate easy removal within a minimum of disturbing force to accommodate the limited manual skills of a child user. In the most preferred fabrication of the present invention, this minimal attachment force provided by the cooperating clasp attachments of the miniature toy bicycle is selected to allow the child user to remove the miniature toy bicycle easily by simply pushing a hand against the toy bicycle thereby disturbing the clasps and releasing the toy bicycle. The entire miniature toy bicycle set forth herein is readily fabricated of a simple molded plastic material or the like and is suitable for high volume mass production typical of such toys.

Referring to FIGS. 10-29, an alternative embodiment of a toy for supporting a doll on a vehicle is illustrated. The term "vehicle" is used to refer to any structure with one or more wheels that can be used by a child to move from one location to another location. In the previously described embodiments, the vehicle used by a child is a bicycle. In the embodiment illustrated in FIGS. 10-29, the vehicle used by a child is a scooter.

Figure 10:
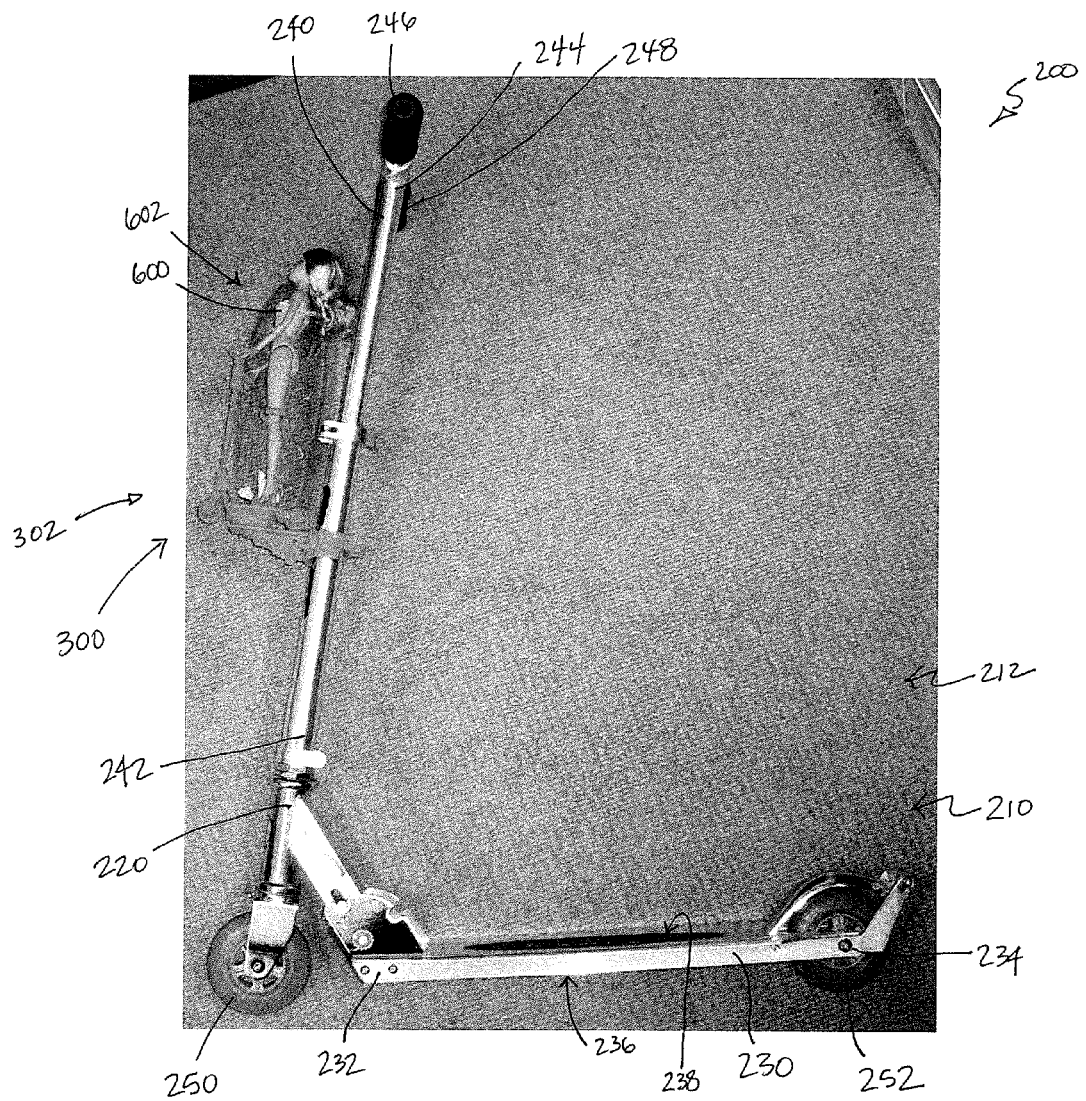
FIG. 10 illustrates a side view of an alternative embodiment of a toy for supporting a doll on a vehicle.

Referring to FIG. 10, in this embodiment, a vehicle system 200 is illustrated. The vehicle system 200 includes a vehicle 210, which in this embodiment is a scooter. Vehicle 210 is configured to be used by a child or adult and typically moves in a forward or rearward direction when used. The vehicle 210 has a particular orientation 212 during travel as shown in FIG. 10.

The vehicle 210 includes a frame 220 that has a support portion or base portion 230 with a lower side 236 and an upper side 238 on which a child can stand. The support portion 230 is configured to support a child thereon in a standing configuration. The support portion 230 has opposite ends 232 and 234 and is supported by a front wheel 250 and a rear wheel 252. A handle or handle portion 240 is coupled to the support portion 230 and the front wheel 250 to facilitate the steering of the vehicle 210. The handle 240 includes a lower end 242, an upper end 244, and a pair of hand grips or grip portions 246 and 248.

As shown in FIG. 10, another vehicle is illustrated. In this embodiment, vehicle 300 can be coupled to vehicle 200. The vehicle 300 is a toy vehicle that can be used with a doll. Vehicle 300 resembles vehicle 200 in that vehicle 300 has a similar overall configuration and is the same type of product, such as both vehicles 200 and 300 are scooter-type vehicles. The similar overall configuration refers to how the different vehicles have similar components and generally look like each other. In addition, riders on the different vehicles having similar configurations would ride the vehicles in the same general manner.

In particular, vehicle 300 can be coupled to the vehicle 200 in an orientation 302 that corresponds to and is substantially the same as the direction and orientation of vehicle 200. As shown, vehicle 300 can have a doll or toy FIG. 600 coupled thereto. The doll 600 can be placed in a configuration or orientation 602 in which it appears that the doll 600 is standing on and riding the vehicle 300. Thus, a child can ride the main or host vehicle 210 and enjoy having the child's doll 600 moving with the child. The toy vehicle 300 and the doll 600 are oriented such that the toy vehicle 300 and the doll 600 are pointed in the direction of travel of the child's vehicle 210, thus simulating the riding of vehicle 300 by the doll 600. As discussed in detail below, vehicle 300 is removably mounted or coupled to vehicle 210, thereby permitting the easy removal of the vehicle 300 and/or the doll 600 for play away from vehicle 210. The toy vehicle 300 can be coupled to vehicle 210 anywhere along its handle 240. The toy vehicle 300 can be adjusted and re-adjusted as desired.

Figure 11:
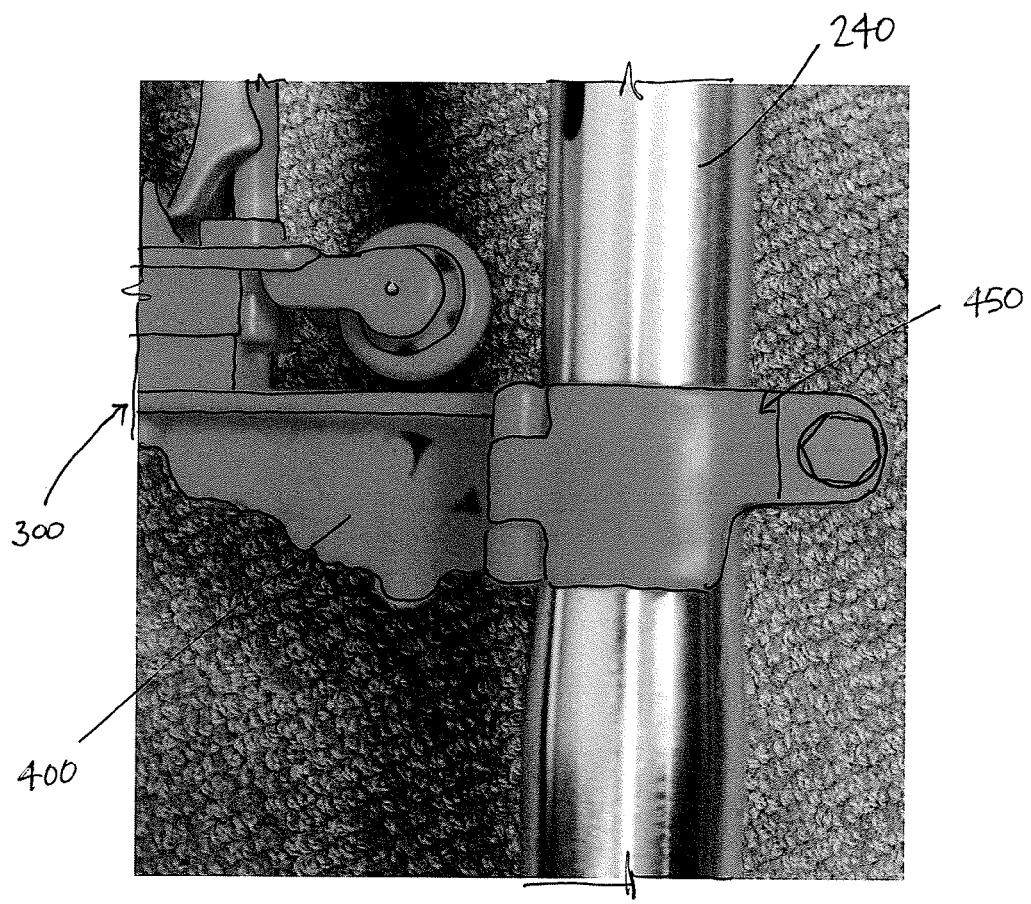
FIG. 11 illustrates a close-up side view of the toy coupled to the vehicle of FIG. 10.

Referring to FIG. 11, a close-up view of the connection of the toy vehicle 300 to vehicle 210 is illustrated. The toy vehicle 300 includes a coupling mechanism or coupler 400 that can be coupled to the frame of vehicle 210. In this embodiment, coupling mechanism 400 includes a clamp or clamping mechanism 450 that encircles a portion of the frame, and in particular handle 240. The clamp 450 can be secured or released to couple the toy vehicle 300 to the handle 240.

Figure 12:
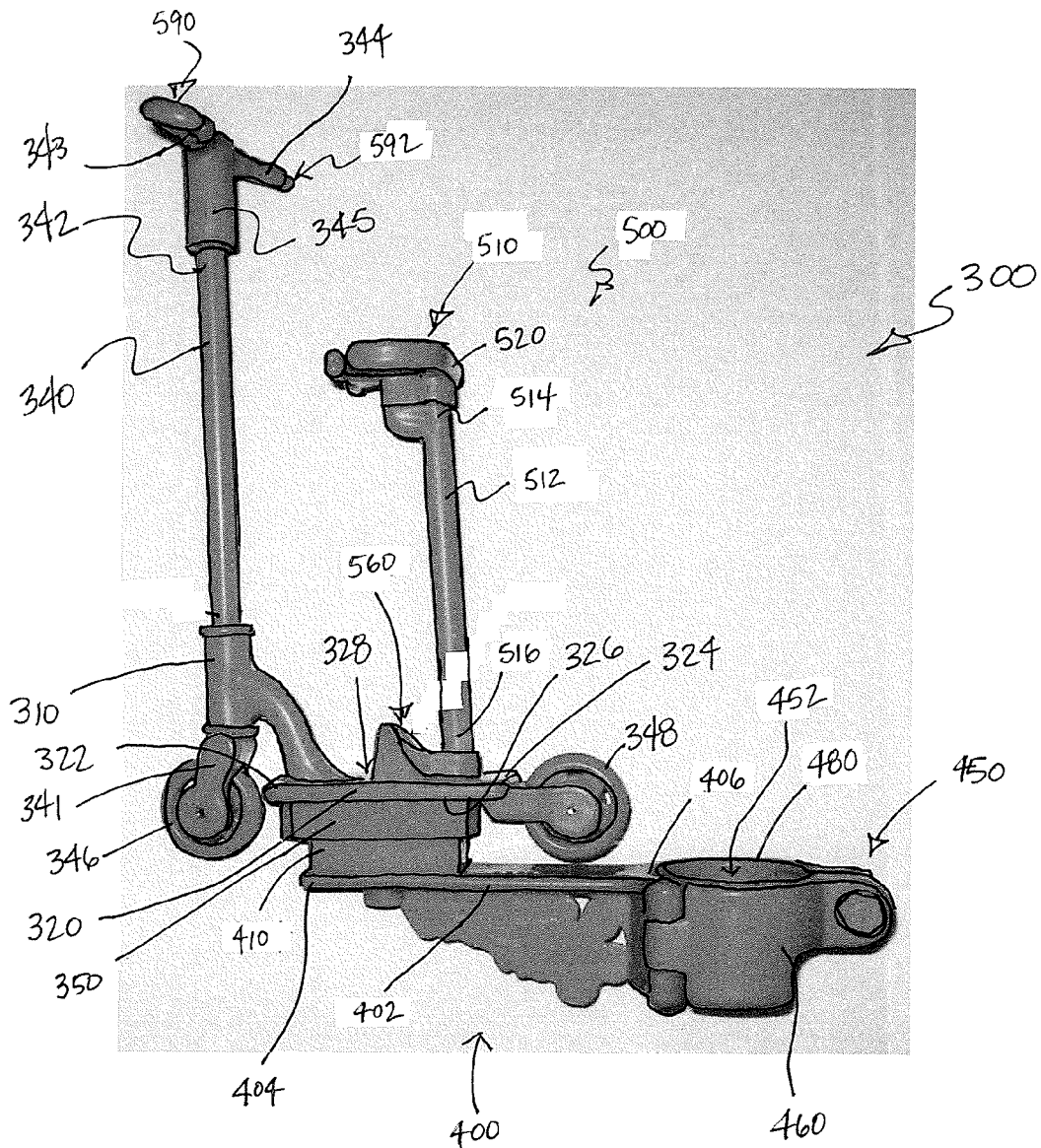
FIG. 12 illustrates a side view of the toy of FIG. 10.

Referring to FIG. 12, an embodiment of toy vehicle 300 is illustrated. In this embodiment, vehicle 300 is formed of a molded plastic material, with the exception of the connectors used to couple different parts together. In alternative embodiments, the vehicle 300 can be formed of a material other than plastic, such as metal, wood, or other material.

As shown in FIG. 12, vehicle 300 includes a frame 310 that has a support portion or base portion 320. The support portion 320 has opposite ends 322 and 324, a lower side 326, and an upper side 328. The vehicle 300 also includes a handle or handle portion 340 that is coupled to the support portion 320. The handle 340 includes a lower end 341 and an upper end 342. Coupled to the lower end 341 of the handle 340 is a front wheel 346 that is coupled to the fork portion of the handle 340 by a pin or connector that allows the front wheel 346 to rotate (see FIG. 15). The vehicle 300 also includes a rear wheel 348 that is rotatably mounted to the fork portion at the rear end 324 of the vehicle 300. The rear wheel 348 is located between rear extensions 330 and 332 (see FIG. 13) and coupled by a pin 349 (see FIG. 16).

Figure 13:
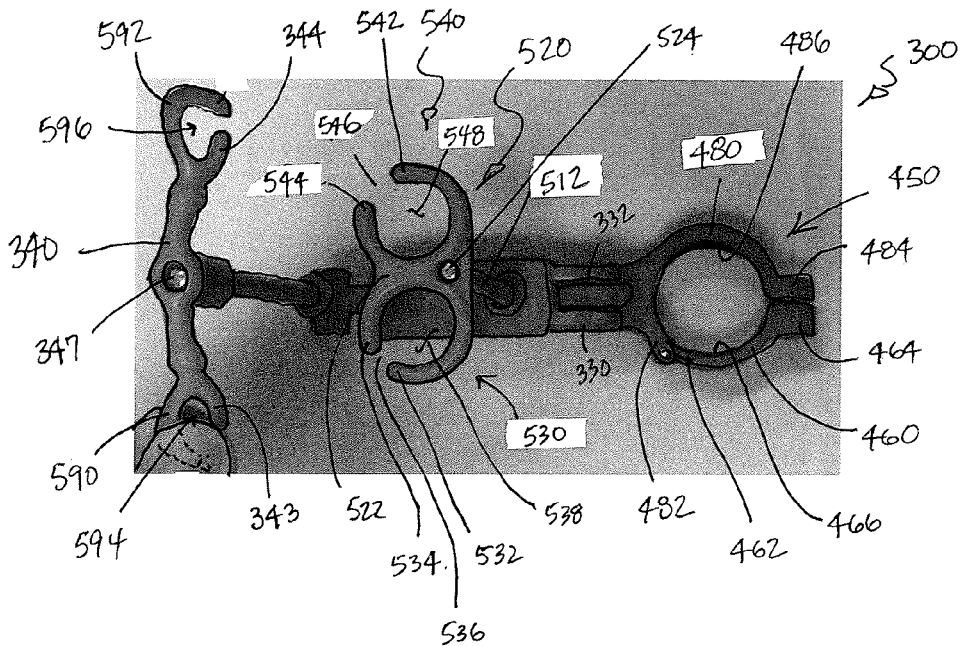
FIG. 13 illustrates a top view of the toy of FIG. 10.

As shown in FIG. 13, the handle portion 340 includes a body 345 that is coupled to the upper end 341 via a connector 347. The body 345 includes hand grips that can be engaged by the hands of a doll. In this embodiment, the hand grips include bars 343 and 344 and bars 590 and 592 that form receptacles 594 and 596 for the hands of the doll as shown.

Referring back to FIG. 12, the vehicle includes a positioning mechanism 500 that is used to retain the doll in a particular position on the vehicle 300. The positioning mechanism 500 can be referred to alternatively as a mounting assembly or a retaining system. In this embodiment, the positioning mechanism 500 has several different components that engage or interact with the doll on the vehicle 300. A component of the positioning mechanism 500 is the pairs of bars 590, 592 and 343, 344 that form receptacles for the hands of the doll.

A component of the positioning mechanism 500 is a support structure 510. In this embodiment, the support structure 510 includes a support member or stand 512 with an upper end 514 and a lower end 516 as shown in FIG. 12. The support member 512 is coupled or mounted to the support portion 320 proximate to its lower end 516. The support structure 510 helps maintain the doll in a standing configuration on the vehicle 300. In this configuration, the doll appears to be riding the vehicle 300. The engagement of a doll with support structure 510 is described below.

Referring to FIG. 13, the support structure 510 includes a coupling assembly 520 that has a body 522 that is coupled to the support member 512 by a connector 524. In an alternative embodiment, the body 522 can be integrally formed with the support member 512. As shown, the body 522 includes two couplers or coupling portions 530 and 540. Coupler 530 defines an opening 538 and has ends 532 and 534 that define a gap 536 therebetween. The ends 532 and 534 can be moved toward and away from each other to accommodate different sized portions of a doll. Similarly, coupler 540 defines an opening 548 and has ends 542 and 544 that define a gap 546 therebetween. In this embodiment, the legs of a doll are inserted into the openings 538 and 548.

Another component of the positioning mechanism 500 is a mounting system 560 that is configured to be engaged by the feet of the doll. Referring to FIG. 12, the location of the mounting system 560 is illustrated. Referring to FIGS. 15-18, the mounting system 560 is illustrated in detail. The mounting system 560 includes mounts or couplers 570 and 580. Each of the couplers 570 and 580 is configured to receive a portion of the doll. In particular, each of the couplers 570 and 580 is configured to receive a foot of the doll as described in detail below. The couplers 570 and 580 help maintain the doll in a standing or riding configuration on the vehicle 300.

Figure 15:
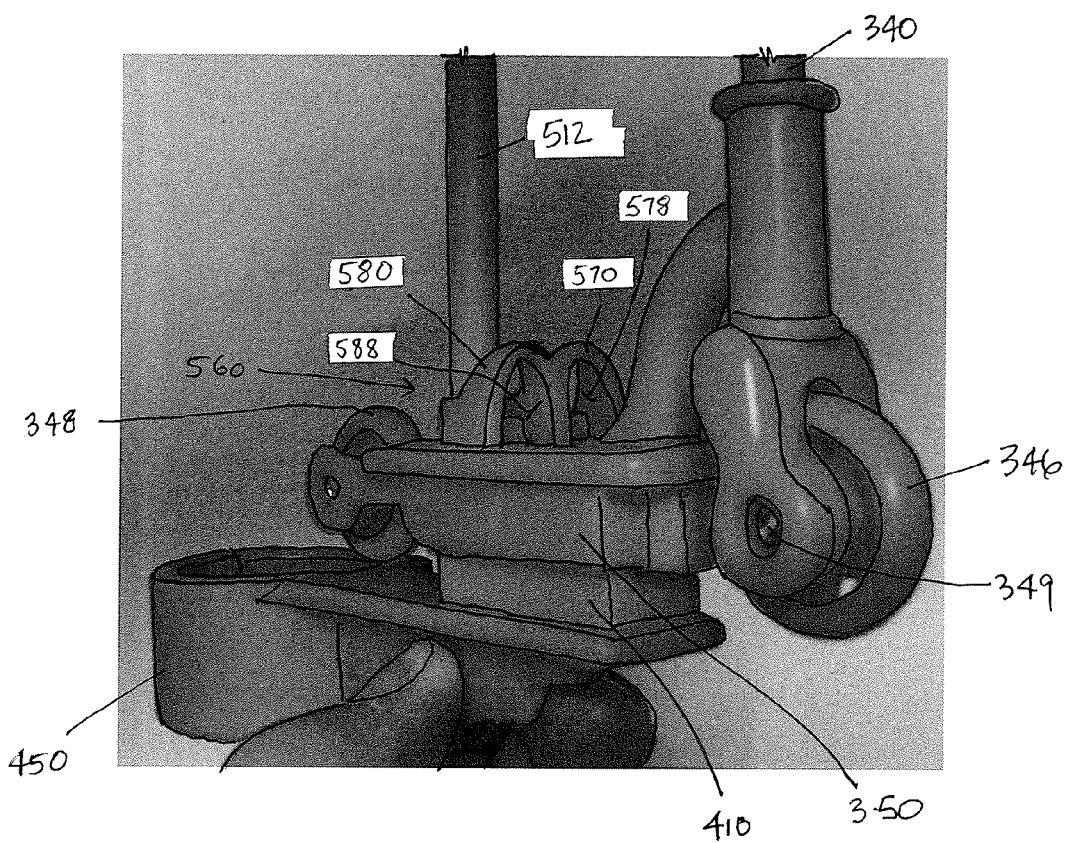
FIG. 15 illustrates a front perspective view of a lower portion of the toy of FIG. 10.
Figure 16:
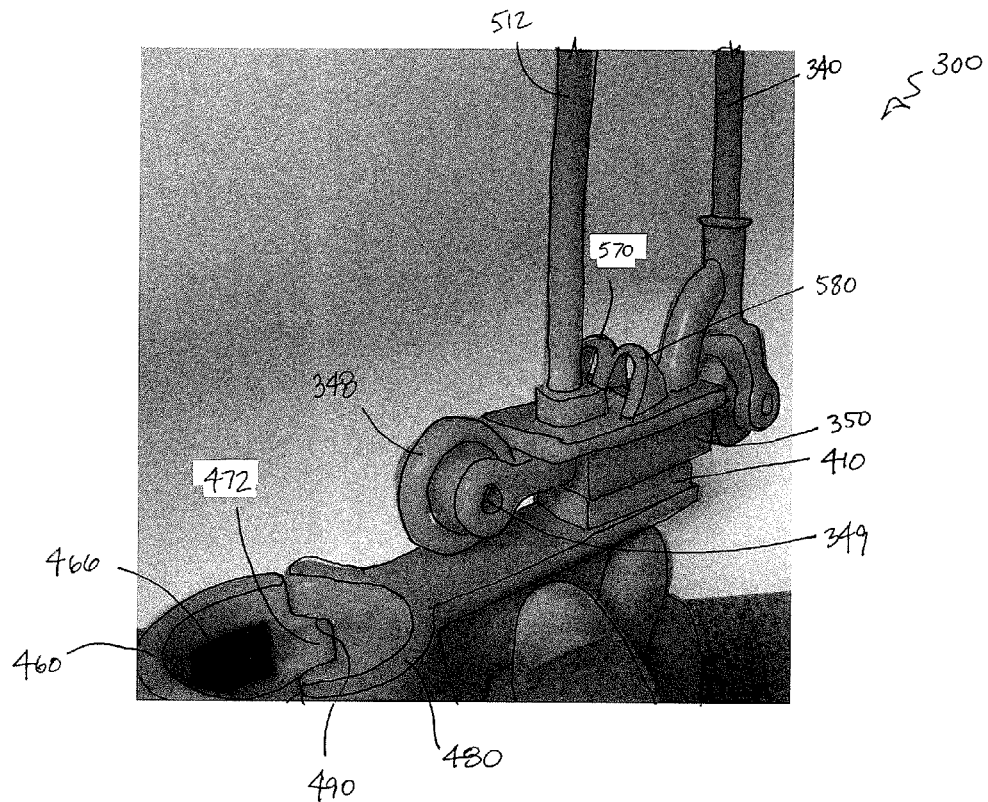
FIG. 16 illustrates a rear perspective view of a lower portion of the toy of FIG. 10.
Figure 17:
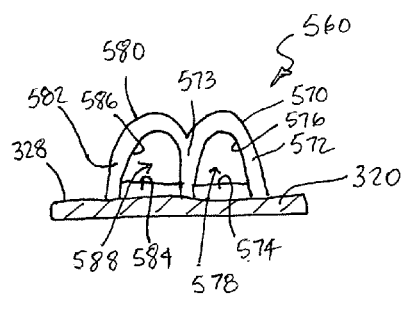
FIG. 17 illustrates a front view of the couplers of the toy of FIG. 10.

As shown in FIG. 15, the couplers 570 and 580 define receptacles 578 and 588, respectively. The receptacles 578 and 588 are configured to receive the feet of a doll. Referring to FIGS. 15 and 16, the receptacles 578 and 588 extend through the couplers 570 and 580. Referring to FIG. 17, the couplers 570 and 580 include side portions 572 and 582, respectively, and share a common portion 583 therebetween. Side portions 572 and 582 have inner surfaces 576 and 586, respectively, which define the receptacles 578 and 588, respectively.

As shown in FIG. 17, a ledge or abutment 574 is located along the bottom of coupler 570 and coupled to the upper surface 328 of the support portion 320. Similarly, a ledge or abutment 584 is located along the bottom of coupler 580 and coupled to surface 328. In one embodiment, the ledges 574 and 584 are integrally formed with the support portion 320.

Figure 18:
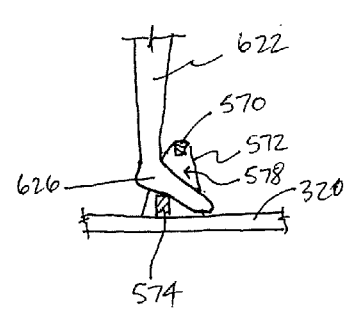
FIG. 18 illustrates a cross-sectional side view of a foot of the doll engaged with a coupler of the toy of FIG. 10.

Referring to FIG. 18, a cross-sectional side view of coupler 570 is illustrated with a foot of a doll included for reference.

As shown, the coupler 570 includes a side portion 572 that defines a receptacle 578 into which the foot 626 of doll leg 622 can be inserted. The ledge or abutment 574 is shown engaging the bottom surface of the foot 626 and providing a friction fit retaining the foot 626 in the receptacle 578 and reducing the likelihood of the foot 626 easily moving out of the receptacle 578. Coupler 580 is used in the same manner.

Referring back to FIG. 12, the toy vehicle 300 includes a coupling mechanism or coupler 400 that is used to couple the toy vehicle 300 to a child's vehicle 200. The coupling mechanism 400 includes a plate or support 402 with opposite ends 404 and 406. Coupled to the plate 402 is a mounting component or bracket 410 that facilitates the engagement and disengagement of the toy vehicle 300 from the coupling mechanism 400. As described below, the mounting component 410 is removably coupleable to a coupler 350 that is connected to the support portion 320 of toy vehicle 300. The connection between the parts is a snap fit connection.

As shown in FIG. 12, the coupling mechanism 400 includes a clamp or clamping assembly 450. Clamp 450 includes arms 460 and 480 that define a receptacle 452 therebetween. The receptacle 452 is configured to correspond to a portion of the frame 220 of vehicle 210. In one embodiment, the arms 460 and 480 are configured to wrap around a portion of a handle 240 of vehicle 210 so that the handle portion 240 is in the receptacle 452.

Figure 14:
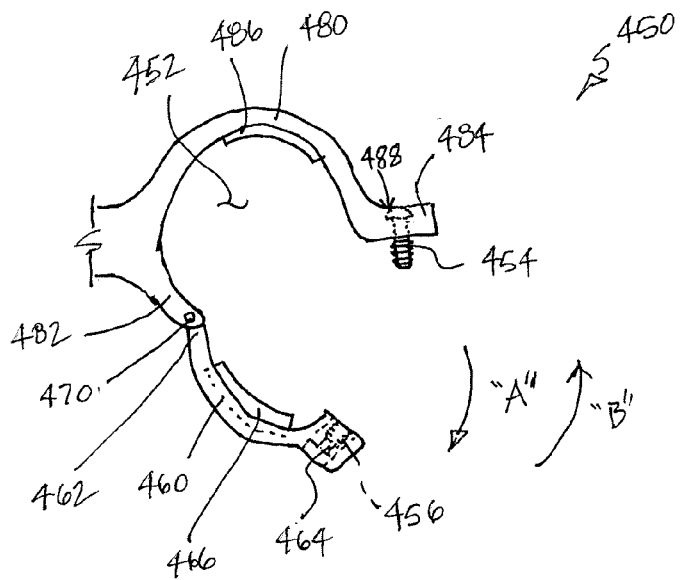
FIG. 14 illustrates a top view of the clamp of the toy of FIG. 10 in an opened configuration.

Referring to FIGS. 13 and 14, arm 460 is pivotally coupled to the plate 410 and movable relative to arm 480 about a pin or connector 470 along the directions of arrows "A" and "B." When arm 460 is moved to its opened or outer position shown in FIG. 14, the clamp 450 can be moved onto part of a vehicle frame which is inserted into the receptacle 452.

Arm 460 includes an end 462 that is pivotally coupled via pin 470 and a distal end 464. The distal end 456 includes an opening in which a connector 456, such as a nut, is located. Arm 460 includes a resilient member 466, such as a piece of rubber, that is located along a portion of the inner surface of arm 460. The resilient member 466 reduces damage to the object to which the clamp 450 is mounted and increases the friction between the parts, thereby improving the stability of the clamp 450 on the vehicle. Arm 480 includes a fixed end 482 which is part of the plate 410 and a distal end 484. The distal end 484 includes an opening 488 in which a connector 454, such as a screw, is inserted. Arm 480 includes a resilient member 486 that functions in a manner similar to resilient member 466 of arm 460. The resilient members 466 and 486 can be mounted in recesses in the arms 460 and 480, respectively, and secured by an adhesive.

Referring to FIG. 16, the connection between the arms 460 and 480 of the clamp 450 is illustrated. As shown, arm 460 includes an extension 472 that is configured to be inserted into a notch 490 formed in the end 482. A pin 470 extends through the portions of end 482 and the extension 472.

Figure 19:
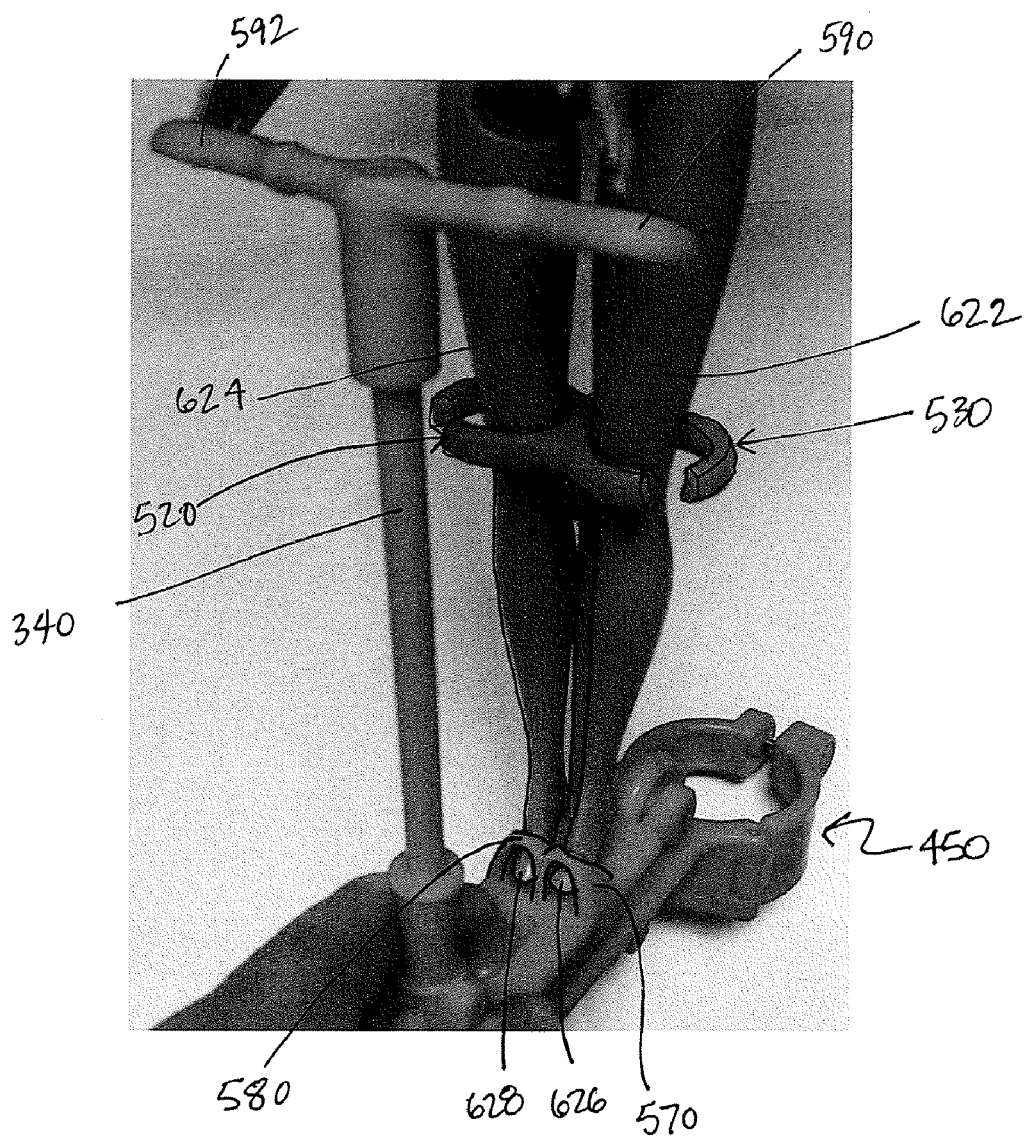
FIG. 19 illustrates a front perspective view of a doll coupled to the toy of FIG. 10.

Referring to FIG. 19, a partial view of the doll 600 on the toy vehicle 300 is illustrated. The doll 600 is illustrated as being engaged with positioning mechanism 500 of the toy vehicle 300. The doll 600 includes legs 622 and 624 that have corresponding feet 626 and 628. As shown, the doll 600 is engaged with component 510 of the toy vehicle 300. Leg 622 is inserted into the receptacle of coupler 530 and leg 624 is inserted into the receptacle of coupler 520. In addition, the doll 600 is engaged with component 560. In particular, foot 626 is inserted into and engaged with coupler 570 and foot 628 is inserted into and engaged with coupler 580. In one configuration, the hands of the doll can be engaged with the bars 590 and 592 on the handle 340.

In this embodiment, the toy vehicle 300 is removable from the coupling mechanism 400. This arrangement allows the coupling mechanism 400 to remain engaged with or coupled to vehicle 200 while a child can remove or decouple the toy vehicle 300 and doll 600, if attached, to play with them separately. Each of the wheels 346 and 348 is rotatable so that a child can move the toy vehicle 300 along a support surface to simulate the vehicle 300 traveling. The child can easily mount the toy vehicle 300 to the coupling mechanism 400 and use the vehicle 210.

Figure 20:
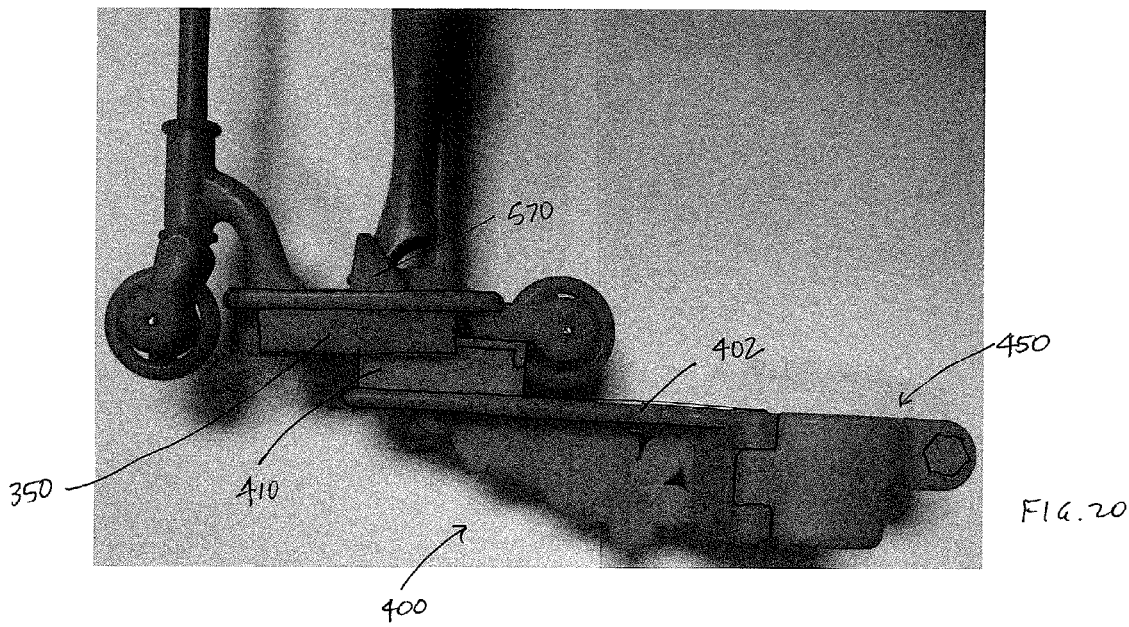
FIG. 20 illustrates a side view of the partial disengagement of the coupling mechanism from the toy of FIG. 10.
Figure 21:
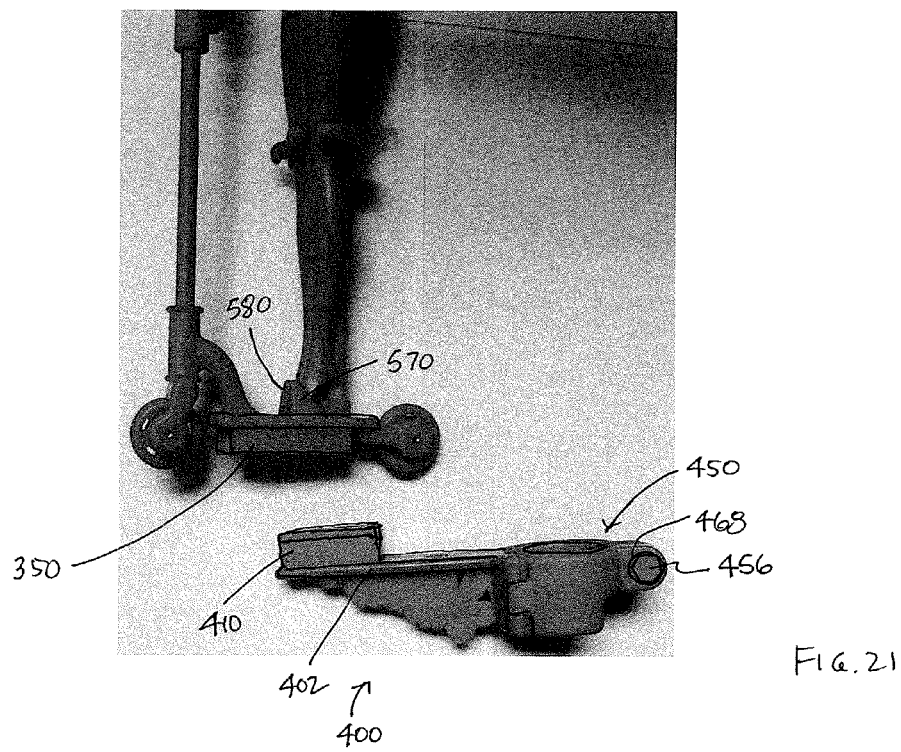
FIG. 21 illustrates a side view of the disengagement of the coupling mechanism from the toy of FIG. 10.

Referring to FIGS. 20-21, the decoupling of the toy vehicle 300 from the coupling mechanism 400 is illustrated. As shown in FIG. 20, the toy vehicle 300 is moved forwardly relative to the coupling mechanism 400. In particular, the coupler 350 and the mounting component 410 slide relative to each other. As shown in FIG. 21, the toy vehicle 300 is disengaged from the coupling mechanism 400 and the doll 600 remains engaged via couplers 570 and 580. The coupling mechanism 400 including plate 402 and mounting component 410 remains coupled via clamp 450 to vehicle 210. A connector 456, such as a nut, is inserted into an opening 468. The screw 454 can be moved into engagement with connector 456 and threaded into the nut 456 to secure the arms 460 and 480 together in a clamping arrangement.

Referring to FIGS. 22-26, the coupling mechanism 400 is illustrated. In this embodiment, the mounting component 410 is coupled to the plate 402 proximate to end 404 opposite end 406. In an alternative embodiment, the mounting component 410 can be moved to a location closer to end 406.

Figure 22:
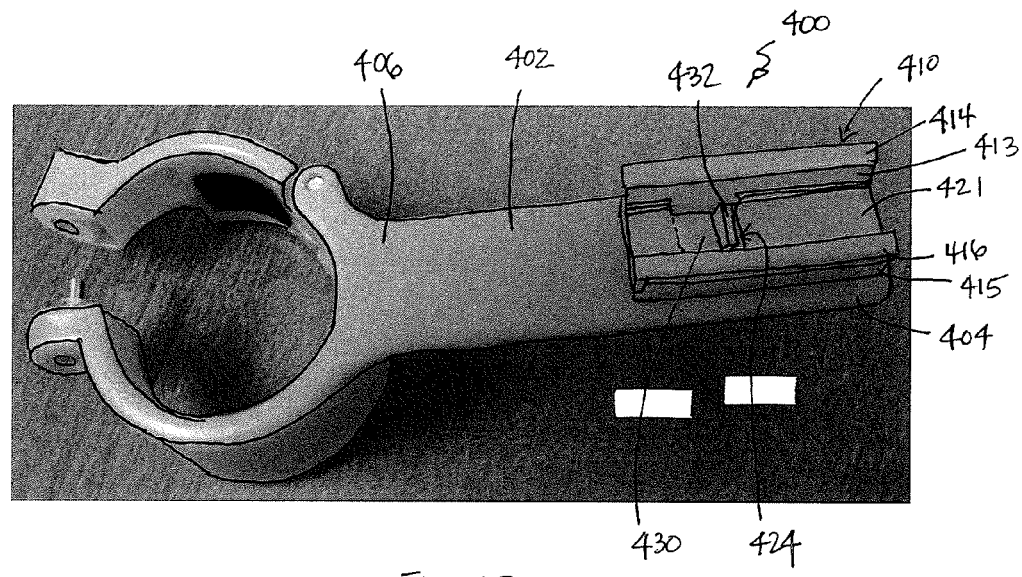
FIG. 22 illustrates a perspective view of the coupling mechanism of the toy of FIG. 10.
Figure 23:
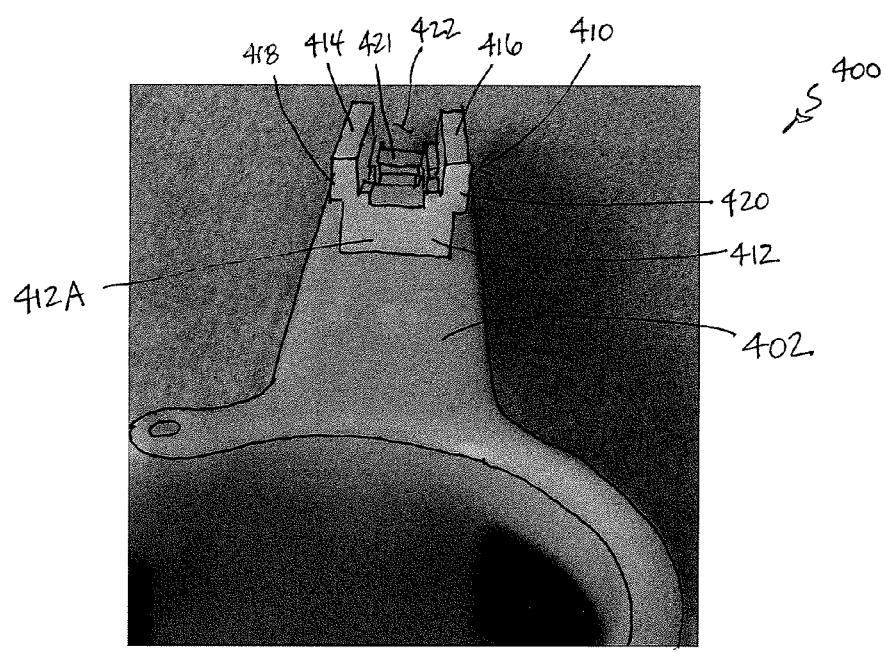
FIG. 23 illustrates a longitudinal view of the coupling mechanism of FIG. 22.

In this embodiment, mounting component 410 includes a body 412 with opposite ends 412A and 412B. The body 412 has side walls or portions 413 and 415 that extend upwardly. At the upper ends of the side walls 413 and 415 are flanges 414 and 416, respectively. Proximate to end 412A of the body 412, stop members 418 and 420 are formed with the flanges 414 and 416, respectively. The stop members 418 and 420 limit the movement of the coupler 350 on toy vehicle 300 relative to the mounting component 410. As shown in FIGS. 22 and 23, the body 412 also includes a surface 421 with two portions that are separated by an opening 424. A tab 430 is integrally formed with the body 412 and is movable into and out of the opening 424. The tab 430 includes a projection 432 that engages a portion of the toy vehicle 300. The surface 421 and side walls 413 and 415 collectively define a channel 422.

A side view of the mounting component 410 is illustrated in FIG. 24. The mounting component 410 has ends 412A and 412B and the side wall 413 extends between the ends 412A and 412B. The flange 414 and the stop or end 416 are illustrated as well. The stop 416 functions as a motion limiting mechanism.

Referring to FIG. 25, a cross-sectional side view of the mounting component is illustrated. As shown, the two spaced apart portions of surface 421 are separated by opening 424. The resilient tab 430 with projection 432 is located in the opening 424 and movable in a downward direction.

Referring to FIGS. 27 and 28, the corresponding structure of the toy vehicle 300 that engages the mounting structure 410 is illustrated. In particular, the coupler 350 can be slid onto the mounting structure 410 of the coupling mechanism 400. As shown, the coupler 350 includes side walls 352 and 354 and an end wall 356. Several tabs are spaced around the coupler 350. In this embodiment, tabs 358 and 360 are spaced apart along side wall 352 and tabs 362 and 364 are spaced apart along side wall 354. The side walls 352 and 354 and tabs define channels 370 and 372 on opposite sides of the mounts 366 and 368 which have openings into which connectors, such as screws, are inserted.

Channel 370 is configured to receive side wall 415 and flange 416. The insertion of the mounting component 410 is stopped when limit 420 engages tab 358. Similarly, channel 372 is configured to receive side wall 413 and flange 414. When limit 420 engages tab 358, limit 418 engages tab 362 at substantially the same time. The mounts 366 and 368 are located so that they are located along the channel 422 when the mounting component 410 is inserted into the coupler 350.

The coupler 350 also includes a plate 374 that extends along an inner surface of the coupler 350 and extends between the mounts 366 and 368. As shown in FIG. 28, the plate 374 includes a guide surface 378 that is engaged by the projection 432 on tab 430 during insertion of the mounting component 410. After the insertion of component 410 a sufficient distance along the direction of arrow "C," the projection 432 engages the notch or recess 380 and its travel is limited by edge 376. The engagement of projection 432 with notch 380 provides a resistance to the easy disengagement of the component 410 and the coupler 350. A side plate 382 may extend from the guide plate 374 for additional reinforcement. To disengage the members, the mounting component 410 is moved in the direction opposite to arrow "C" with sufficient force to overcome the projection 432 being in notch 380.

Figure 28A:
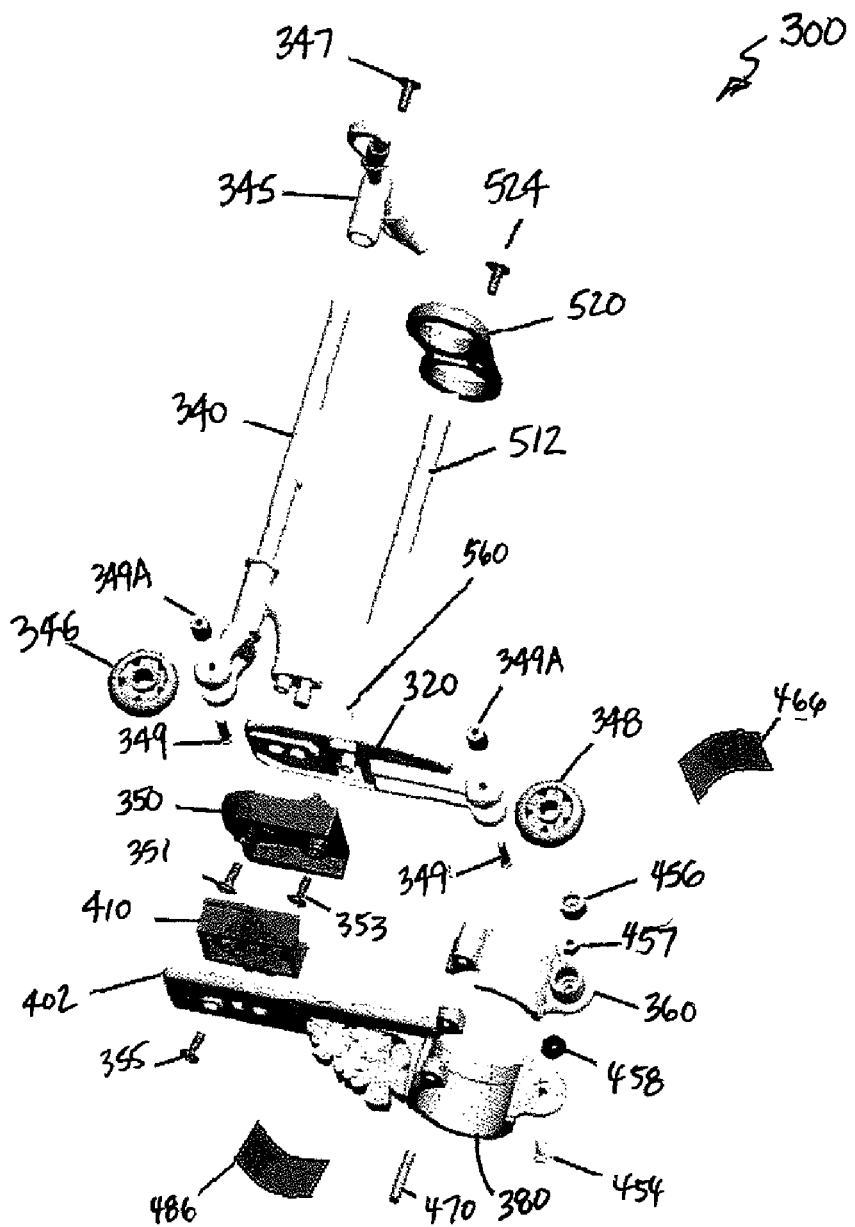
FIG. 28A illustrates an exploded view of the various components of the toy of FIG. 10.

Referring to FIG. 28A, an exploded perspective view of the various components of the toy vehicle 300 is illustrated. Most of the parts have been described above. FIG. 28A shows the connectors or screws 351 and 353 that are used to mount the coupler 350 to the support portion 320. In addition, connector or screw 355 that is used to couple the mounting component 410 to the plate 402 is illustrated. Also, the bushings 349A that the pins or screws 349 are inserted into to mount the front wheel 346 and the rear wheel 348 are shown. The various parts of the clamp 450 are also illustrated. The clamp 450 includes the connector 456 that has an internal nut 457 that receives the screw 454. A washer 458 can be used as well.

Figure 29:
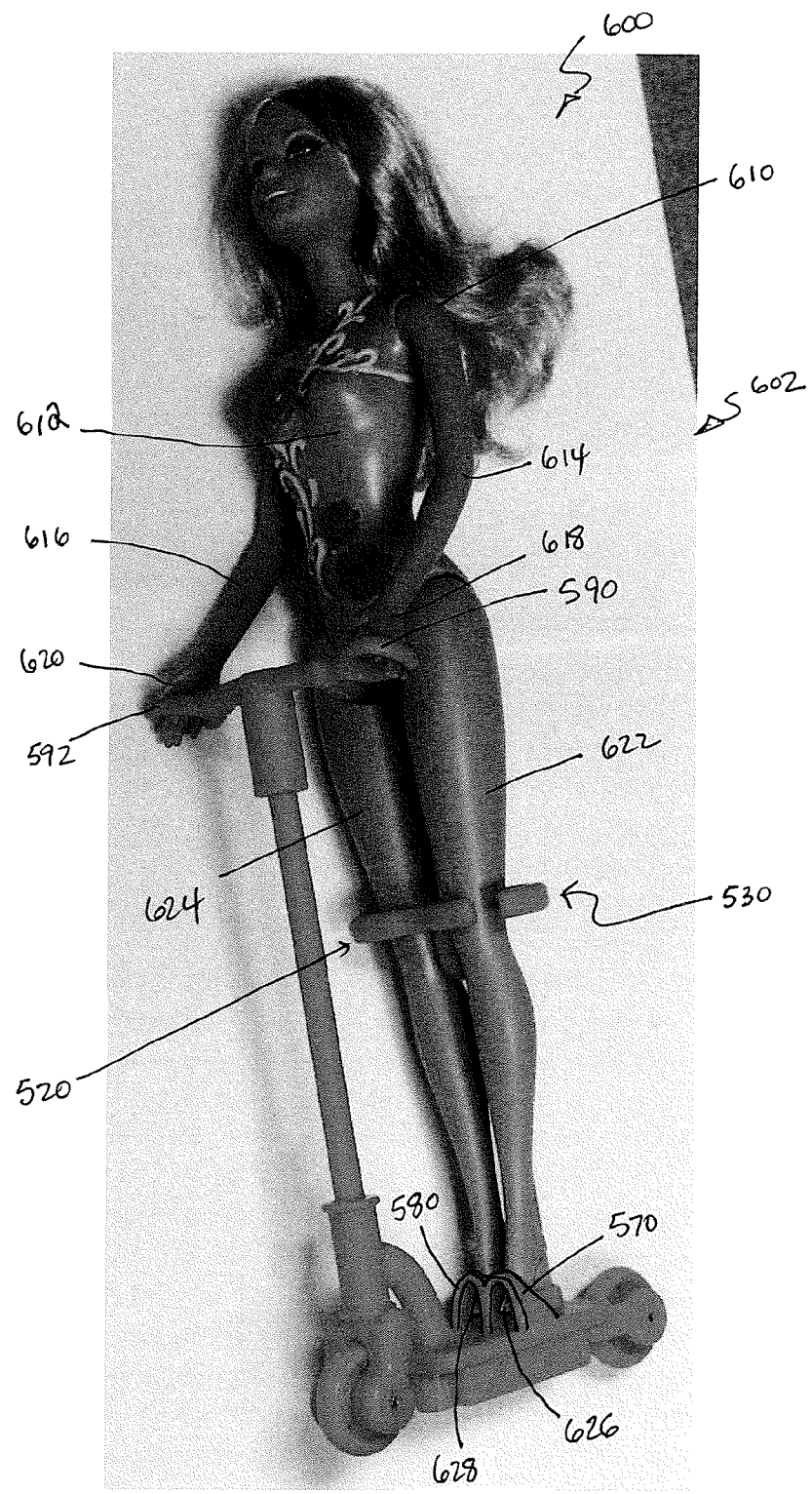
FIG. 29 illustrates a front perspective view of a doll coupled to the toy of FIG. 10.

Referring to FIG. 29, the doll 600 and the toy vehicle 300 are illustrated. The doll is illustrated in a standing configuration or orientation 602. In this embodiment, the doll 600 includes a body 610 that includes a torso 612 with arms 614 and 616 coupled thereto. The arms 614 and 616 may be pivotally coupled to the torso 612 and include hands 618 and 620, respectively. The body 610 also includes legs 622 and 624 that have feet 626 and 628, respectively. As shown, the legs 622 and 624 engage the couplers 530 and 520, respectively, and the feet 626 and 628 engage the couplers 570 and 580, respectively. In addition, the hands 618 and 620 engage the bars 590 and 592, respectively.

In various modes of play, different combinations of the body portions of the doll 600 are engaged with different parts of the toy vehicle 300. For example, in one configuration, the legs 622 and 624 may be engaged but the feet 626 and 628 are not engaged.

Figure 30:
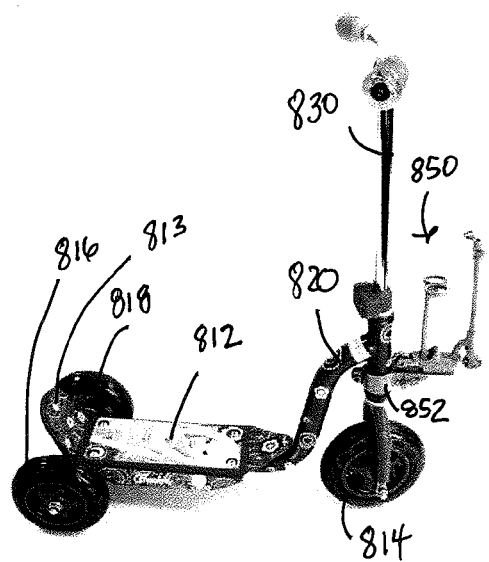
FIGS. 30 and 31 illustrate side perspective and close-up front perspective views of an alternative embodiment of a vehicle system.
Figure 31:
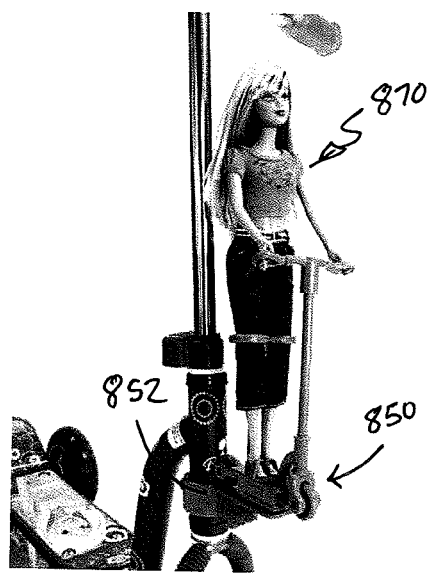

Referring to FIGS. 30 and 31, an alternative embodiment of a vehicle system is illustrated. In this embodiment, the vehicle system 800 includes a child's vehicle or scooter 810 which includes a base portion 812 with a rear plate 813, a front wheel 814, and rear wheels 816 and 818. Coupled to the base portion 812 is a frame 820 to which a handle 830 is coupled. The vehicle system 800 also includes a toy vehicle or scooter 850 that is coupled to the frame 820 of scooter 810. The scooter 850 can be coupled to scooter 810 via a clamp 852. As shown in FIG. 31, a doll 870 can be placed and retained on the scooter 850 in a standing configuration.

Figure 32:
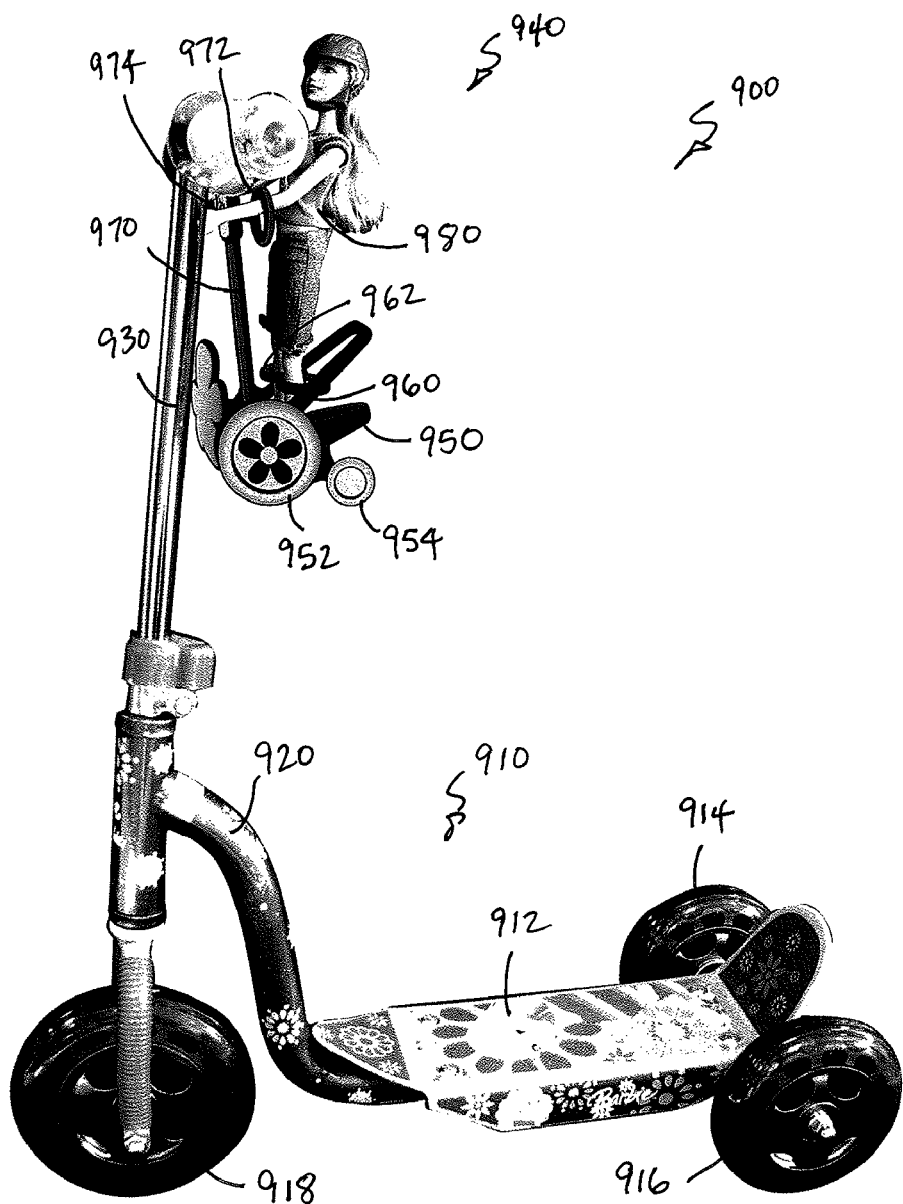
FIG. 32 illustrates a side perspective view of another embodiment of a vehicle system.

Referring to FIG. 32, an alternative embodiment of a vehicle system is illustrated. In this embodiment, the vehicle system 900 includes a child's vehicle or scooter 910 which includes a base portion 912 and frame 920 that are supported by front wheel 918 and rear wheels 914 and 916. The vehicle 910 includes a handle 930 to which a toy vehicle assembly 940 is coupled using a coupling mechanism.

The toy vehicle assembly includes a vehicle, which resembles a scooter. The vehicle has a frame 950 includes one or more front wheels 952 and one or more rear wheels 954 coupled thereto. The frame 950 includes coupling mechanisms 960 and 962 that define receptacles into which the legs of the doll 980 are inserted. In this embodiment, the coupling mechanisms are substantially circular and supported on the frame 950. A handle 970 extends upwardly and includes coupling mechanisms 972 and 974 that define receptacles through which the arms of the doll 980 can extend. In this embodiment, the coupling mechanisms 972 and 974 are substantially circular. In alternative embodiments, the coupling mechanisms 960, 962, 970, and 972 can have different shapes or configurations.

In different embodiments, the toy vehicle can be coupled to the host or child's vehicle using a friction fit connection. In an alternative embodiment, the toy vehicle can be stroller for a doll and the toy vehicle can be coupled to a child's vehicle, which can be a stroller. In another embodiment, the toy vehicle can be a skateboard for a doll that can be coupled to a child's vehicle, such as a skateboard.

It is to be understood that terms such as "left," "right," "top," "bottom," "front," "rear," "side," "height," "length," "width," "upper," "lower," "interior," "exterior," "inner," "outer" and the like as may be used herein, merely describe points or portions of reference and do not limit the present invention to any particular orientation or configuration. Further, terms such as "first," "second," "third," etc., merely identify one of a number of portions, components and/or points of reference as disclosed herein, and do not limit the present invention to any particular configuration or orientation or any particular quantity of such elements.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

What is claimed is:

1. A vehicle system, comprising:
   a first vehicle configured to support a child in a standing configuration on the first vehicle while riding the first vehicle, the first vehicle including a frame and a front wheel and a rear wheel coupled to the frame, the frame including a support portion on which the child can be positioned; and
   a second vehicle configured to support a doll in a standing configuration on the second vehicle, the second vehicle including a frame and a front wheel and a rear wheel coupled to the frame of the second vehicle, the frame of the second vehicle including a support portion on which the doll can be positioned, the frame of the second vehicle including a coupling mechanism configured to removably couple the second vehicle to the first vehicle the coupling mechanism having a first end and second end opposite to the first end, the coupling mechanism including a clamp located proximate to the first end and a mounting component that couples the second vehicle to the coupling mechanism, the second vehicle including a coupler proximate to a lower surface of the second vehicle, the coupler being engageable with the mounting component to mount the second vehicle to the first vehicle.

2. The vehicle system of claim 1, wherein the first vehicle is a scooter with a handle coupled to the frame of the first vehicle, the handle being engaged by the child when the child is on the first vehicle, and the second vehicle is a scooter with a handle coupled to the frame of the second vehicle, the handle of the second vehicle being engaged by the doll when the doll is on the second vehicle.

3. The vehicle system of claim 1, wherein the second vehicle includes a positioning mechanism coupled to the frame, the positioning mechanism being configured to couple the doll to the second vehicle.

4. The vehicle system of claim 1, wherein the second vehicle includes a positioning mechanism coupled to the frame, the positioning mechanism is configured to couple the doll to the second vehicle, the positioning mechanism including at least one mount coupled to the support portion of the second vehicle, the at least one mount defining a receptacle into which a portion of the doll may be inserted.

5. The vehicle system of claim 4, wherein the portion of the doll inserted into the at least one mount is a foot of the doll, and the positioning mechanism maintains the doll in a standing configuration on the second vehicle.

6. The vehicle system of claim 1, wherein the second vehicle includes a positioning mechanism coupled to the frame, the positioning mechanism is configured to couple the doll to the second vehicle, the positioning mechanism including a support structure coupled to the support portion of the second vehicle, the support structure engaging a portion of the doll at a location spaced apart from the support portion of the second vehicle.

7. The vehicle system of claim 6, wherein the doll includes a pair of legs, the portion of the doll is one of the legs of the doll, and the support structure includes a support member and a coupler coupled to the support member, the coupler being configured to receive a leg of the doll.

8. The vehicle system of claim 1, wherein the coupling mechanism of the second vehicle couples the second vehicle to the frame of the first vehicle in substantially the same orientation as the first vehicle.

9. The vehicle system of claim 1, wherein the first vehicle frame includes a handle portion, and the coupling mechanism of the second vehicle couples the second vehicle to the handle portion of the first vehicle frame.

10. The vehicle system of claim 1, wherein the coupling mechanism extends substantially horizontal relative to a support surface on which the first vehicle is placed when the coupling mechanism is mounted to the first vehicle, the second end being located forward of the first end, the clamp is located proximate to the first end of the coupling mechanism, the mounting component is proximate to the second end of the coupling mechanism, the second vehicle being slidable onto the mounting component to couple the second vehicle to the coupling mechanism.

11. The vehicle system of claim 1, wherein the second vehicle is removably coupleable to the coupling mechanism when the coupling mechanism is connected to the first vehicle.

12. A toy vehicle for a scooter, the scooter including a base portion, a handle portion coupled to the base portion, and a pair of wheels supporting the base portion, the scooter being configured to support a child on the base portion, the toy vehicle comprising:
a base portion configured to support a doll on the base portion of the toy vehicle;
a handle portion coupled to the base portion of the toy vehicle;
a pair of wheels; and
a mounting assembly coupled to the base portion of the toy vehicle, the mounting assembly including a first end, a second end opposite to the first end, and a coupler configured to engage the handle portion of the scooter to secure the toy vehicle on the scooter, the mounting assembly extending forwardly on the scooter when the first end is coupled to the scooter so that the second end is forward relative to the first end, the toy vehicle being coupleable to the mounting assembly via a coupler located proximate to a lower surface of the toy vehicle, the toy vehicle being supportable on the scooter such that the doll on the toy vehicle can be placed in the same orientation and configuration as a child located on the scooter.

13. The toy vehicle of claim 12, wherein the toy vehicle is a toy scooter, and the doll can be positioned on the toy scooter in a standing configuration.

14. The toy vehicle of claim 13, wherein the doll includes a torso, a pair of arms coupled to the torso, and a pair of legs coupled to the torso, and the toy vehicle includes a retaining system configured to couple the doll to the toy vehicle, the retaining system receiving a portion of at least one of the legs to retain the portion of at least one of the legs in position relative to the base portion of the toy vehicle.

15. The toy vehicle of claim 14, wherein the retaining system includes a support member coupled to the base portion of the toy vehicle and extending upwardly therefrom, the support member having a coupler connected thereto, the coupler of the support member being configured to receive the portion of at least one of the legs.

16. The toy vehicle of claim 14, wherein the retaining system includes a coupler connected to the base portion of the toy vehicle, the coupler of the retaining system and the base portion of the toy vehicle collectively defining a receptacle, the portion of at least one of the legs is a foot of the doll, and the receptacle is configured to receive the foot of the doll.

17. The toy vehicle of claim 12, wherein the toy vehicle is a toy scooter and the scooter is a host scooter, the toy scooter can be coupled to the host scooter so that the host scooter and the toy scooter are oriented in the same direction of travel, and the child on the host scooter and the doll on the toy scooter are oriented in the same direction as each other.

18. The toy vehicle of claim 12, wherein the toy vehicle includes a retaining system configured to couple the doll to the toy vehicle in a standing configuration.

19. The toy vehicle of claim 12, wherein the doll includes a torso, a pair of arms coupled to the torso, and a pair of legs coupled to the torso, and the toy vehicle includes a retaining system configured to couple the doll to the toy vehicle, the retaining system receiving a portion of at least one of the arms to retain the portion of at least one of the arms in position relative to the base portion of the toy vehicle.

20. The toy vehicle of claim 19, wherein the retaining system includes bars coupled to the handle portion of the toy vehicle, the bars and the handle portion of the toy vehicle receiving hands of the doll when the doll is mounted on the toy vehicle.

21. The toy vehicle of claim 12, wherein the first end has a pivotally mounted arm that facilitates the coupling of the first end to the handle portion of the scooter, the toy vehicle being slidable onto the second end of the mounting assembly.

22. A vehicle system, comprising:
a first vehicle including:
a base portion configured to support a child in a standing configuration;
a pair of wheels coupled to and supporting the base portion; and a handle portion coupled to the base portion, the handle portion being useable by the child to steer the first vehicle in a direction of travel; and a second vehicle including:

a base portion configured to support a doll in a standing configuration, the base portion of the second vehicle including a supporting system receiving a portion of the doll so that the doll is maintained in the standing configuration the base portion including a coupler proximate to a lower surface of the base portion;

a handle portion coupled to the base portion of the second vehicle; and a coupling mechanism configured to couple the second vehicle to the first vehicle the coupling mechanism having a first end and second end opposite to the first end, the coupling mechanism including a clamp located proximate to the first end and a mounting component that couples the second vehicle to the coupling mechanism, the coupler being engageable with the mounting component to mount the second vehicle to the first vehicle.

23. The vehicle system of claim 22, wherein the supporting system receives a portion of the doll and maintains the portion of the doll in a position relative to the base portion of the second vehicle.

24. The vehicle system of claim 22, wherein the doll includes a torso, a pair of arms coupled to the torso, and a pair of legs coupled to the torso, each of the legs includes a foot, and the supporting system includes a stand with a first coupler and a second coupler connected thereto, each of the first coupler and the second coupler being configured to receive one of the legs of the doll.

25. The vehicle system of claim 24, wherein the supporting system includes a first mount and a second mount coupled to the base portion of the second vehicle, each of the first mount and the second mount being configured to receive one of the feet of the doll.

26. The vehicle system of claim 22, wherein the coupling mechanism includes a plate extending substantially horizontally forward relative to a support surface on which the first vehicle is placed when the plate is coupled to the first vehicle, the clamp having a fixed arm and a movable arm, the movable arm being connectable to the fixed arm to secure the plate to the first vehicle, the plate having a bracket proximate to the second end, and the coupler defining an area into which the bracket can be slid to mount the second vehicle to the plate and to the first vehicle.

* * * * *